United States Patent
Watanabe et al.

(10) Patent No.: US 11,125,950 B2
(45) Date of Patent: Sep. 21, 2021

(54) OPTICAL CONNECTOR, AND OPTICAL CONNECTOR CONNECTION STRUCTURE

(71) Applicant: FURUKAWA ELECTRIC CO., LTD., Tokyo (JP)

(72) Inventors: Kengo Watanabe, Tokyo (JP); Katsuki Suematsu, Tokyo (JP); Masato Shiino, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 16/700,847

(22) Filed: Dec. 2, 2019

(65) Prior Publication Data

US 2020/0103597 A1    Apr. 2, 2020

Related U.S. Application Data

(63) Continuation of application No. PCT/JP2018/021146, filed on Jun. 1, 2018.

(30) Foreign Application Priority Data

Jun. 2, 2017    (JP) .............................. JP2017-109955

(51) Int. Cl.
*G02B 6/26*    (2006.01)
*G02B 6/38*    (2006.01)
(Continued)

(52) U.S. Cl.
CPC ......... *G02B 6/3829* (2013.01); *G02B 3/0056* (2013.01); *G02B 6/12011* (2013.01); *G02B 6/29301* (2013.01)

(58) Field of Classification Search
CPC .............. G02B 6/3829; G02B 3/0056; G02B 6/12011; G02B 6/29301; G02B 1/115; G02B 6/32
See application file for complete search history.

(56) References Cited

U.S. PATENT DOCUMENTS 6,012,852 A * 1/2000 Kadar-Kallen .......... G02B 6/32
385/74
6,587,618 B2   7/2003 Raguin et al.
(Continued)

FOREIGN PATENT DOCUMENTS

CN    104280838 A    1/2015
CN    105445866 A    3/2016
(Continued)

OTHER PUBLICATIONS

International Search Report and Written Opinion for App. No. PCT/JP2018/021146 (Engl. translation of ISR only), dated Aug. 28, 2018.
(Continued)

*Primary Examiner* — Ellen E Kim
(74) *Attorney, Agent, or Firm* — Dorsey & Whitney LLP

(57) ABSTRACT

A return loss in an optical connector connection structure according to a lens scheme is reduced. An optical connector (10) according to this disclosure, includes: a plurality of optical fibers (18) arranged in an array; and a lens array plate (14) that includes a first principal surface (40) with a plurality of lenses (44) corresponding to the respective optical fibers being formed on this surface, and a second principal surface (41) joined to end faces (180) of the optical fibers so as to be opposed to the first principal surface and optically coupled to the optical fibers to which the respective lenses correspond, wherein at least one of the end faces of the optical fibers and the second principal surface is inclined from a plane (182) perpendicular to optical axes (181) of the optical fibers.

15 Claims, 20 Drawing Sheets

(51) Int. Cl.
*G02B 3/00* (2006.01)
*G02B 6/12* (2006.01)
*G02B 6/293* (2006.01)

(56) References Cited

U.S. PATENT DOCUMENTS

| | | | |
|---|---|---|---|
| 6,625,350 B2* | 9/2003 | Kikuchi | G02B 6/327 385/31 |
| 2002/0097957 A1 | 7/2002 | Kikuchi et al. | |
| 2003/0063853 A1* | 4/2003 | Huang | G02B 6/32 385/34 |
| 2003/0122064 A1* | 7/2003 | Tanaka | G02B 6/2937 250/227.11 |
| 2003/0138202 A1* | 7/2003 | Zhou | G02B 6/327 385/33 |
| 2003/0142909 A1 | 7/2003 | Suzuki et al. | |
| 2004/0047557 A1* | 3/2004 | Muto | G02B 6/32 385/33 |
| 2004/0067015 A1* | 4/2004 | Nakajima | G02B 6/32 385/33 |
| 2011/0026882 A1 | 2/2011 | Budd et al. | |
| 2015/0016786 A1 | 1/2015 | Chang et al. | |
| 2016/0085030 A1 | 3/2016 | Arao et al. | |
| 2016/0139339 A1 | 5/2016 | Sasaki et al. | |
| 2016/0266318 A1 | 9/2016 | Okada | |
| 2016/0341909 A1 | 11/2016 | Childers et al. | |

FOREIGN PATENT DOCUMENTS

| | | |
|---|---|---|
| CN | 105607161 A | 5/2016 |
| JP | 01-079629 A | 3/1989 |
| JP | 2003107277 A | 4/2003 |
| JP | 2003215388 A | 7/2003 |
| JP | 2016061942 A | 4/2016 |
| JP | 2016166929 A | 9/2016 |
| WO | 2018221717 A1 | 12/2018 |

OTHER PUBLICATIONS

English translation of First Office Action for CN Application No. 201880036718.2, dated Apr. 24, 2020.
English translation of International Preliminary Report on Patentability for Application No. PCT/JP2018/021146, dated Dec. 3, 2019.
English translation of Written Opinion for Application No. PCT/JP2018/021146, dated Aug. 28, 2018.
English translation of Office Action for CN Application No. 201880036718.2, dated Jan. 12, 2021.

* cited by examiner

OPTICAL CONNECTOR, AND OPTICAL CONNECTOR CONNECTION STRUCTURE

CROSS REFERENCE TO RELATED APPLICATIONS

The present application is a continuation application of International Patent Application No. PCT/JP2018/021146 filed on Jun. 1, 2018, which claims the benefit of Japanese Patent Application No. 2017-109955, filed on Jun. 2, 2017. The contents of these applications are incorporated herein by reference in their entirety.

BACKGROUND

Technical Field

The present disclosure relates to an optical connector, and an optical connector connection structure that connects optical connectors to each other.

Background

For construction of optical wiring using optical fibers in a data center, use of optical connectors having multiple cores to address increase in scale due to increase in data traffic becomes general. Furthermore, demands for long-distance transmission and large-capacity transmission have been increasing. Single-mode (SM) optical fibers that can satisfy these demands are increasingly used as optical fibers that construct optical wiring.

A physical contact (PC) scheme and a lens scheme are known as schemes of connecting optical fibers, for optical connectors having multiple cores. According to the PC scheme, by causing tips of optical fibers in an optical fiber array to be connected to butt against each other by pressing forces and physically contacting each other, thus physically connecting the optical fibers. On the other hand, according to the lens scheme, lens arrays including lenses corresponding to optical fibers in an optical fiber array are provided for optical connectors, and the optical connectors provided with the lens arrays are caused to face and fixed, thereby optically connecting the optical fibers via the lens.

In recent years, by further demands for optical connectors to increase the number of cores and to achieve a single mode configuration, attention is attracted on multicore connectors according to the lens scheme. For example, in Japanese Patent Application Laid-Open No. 2003-107277, an optical connector connection structure that joins two connectors made up of multicore optical fibers via a lens array for optical connectors is disclosed as a structure of connecting multicore connectors according to the lens scheme.

SUMMARY

In recent years, as a next-generation optical transmission technique, research on an optical transmission system of 400-Gigabit Ethernet® has been developed. For this optical transmission system, an optical connector that satisfies a return loss of −45 dB or less is required. It is believed that with the aforementioned optical connector connection structure that connects multicore optical fibers in a single mode according to the PC scheme, the aforementioned specifications of the return loss can be satisfied.

However, it is difficult for the conventional optical connector connection structure that connects the multicore optical fibers in the single mode according to the lens scheme to satisfy the specifications of the return loss required for the optical transmission system of 400-Gigabit Ethernet®. Hereinafter, this point will be described in detail with reference to the accompanying drawings.

FIG. 28 schematically shows a configuration of an optical connector according to the lens scheme that the inventors of the present application discussed prior to the present application. In this diagram, in an optical connector 90 for connecting multicore optical fibers in the single mode according to the lens scheme, the structure of a part where a lens array plate 93 with a plurality of lenses 94 being formed on the surface of this plate, and a ferrule 92 that accommodates a plurality of optical fibers 98 are joined to each other, is schematically shown.

As shown in FIG. 28, parts of light that propagate in the optical fibers 98 and are emitted from end faces 198 of the optical fibers 98 toward the lenses 94 are reflected on the interfaces between the end faces 198 of the optical fibers 98 and lens rear faces 193 of the lens array plate 93, which are joined via an adhesive 99. Since the reflected light from the interfaces is coupled into the optical fibers 98 substantially at a rate of 100%, the return loss at the interfaces becomes large.

Since, in the optical connector 90, quartz glass (refractive index n=1.45) forming the optical fibers 98 and resin material (refractive index n=1.48 to 1.67) forming the lens array plate 93 have refractive indices different from each other, the Fresnel loss tends to increase.

For example, even if the interfaces between the optical fibers 98 and the lens array plate 93 are configured to be flat interfaces and an adhesive 99 having an optimal refractive index is used, the return loss rate is about −35 dB in a case where the lens array plate 93 is made of cycloolefin polymer (refractive index n=1.51), the return loss rate is about −25 dB in a case where the lens array plate 93 is made of polyetherimide (refractive index n=1.66), and the return loss rate is about −40 dB in a case where the lens array plate 93 is made of polymethyl methacrylate (refractive index n=1.49), and the specifications required for an optical transmission system of 400-Gigabit Ethernet® cannot be satisfied.

As shown in FIG. 28, parts of light propagating in the lens array plate 93 are reflected on the interfaces between the protruding surfaces 194 of the lenses 94 and air, and some parts of the reflected light are coupled into the optical fibers 98. The rate of the reflected light that is from the interfaces and is coupled into the optical fibers 98 is lower than the rate of the reflected light that is from the interfaces between the optical fibers 98 and the lens array plate 93 described above and is coupled into the optical fibers 98. However, the rate serves as a factor of degrading the return loss at the optical connector 90.

In addition to the above description, since the single-mode fibers (SMFs) have small cores, a high accuracy is required to position the cores and lens optical axes for the sake of connection with low loss. It is desired to have a positioning accuracy of 1.5 micrometers or less.

As described above, it is difficult for the conventional optical connector connection structure according to the lens scheme to satisfy the specifications of the return loss required for the optical transmission system of 400-Gigabit Ethernet®.

The present disclosure is related to reduction in return loss in the optical connector connection structure according to the lens scheme.

An optical connector according to a typical embodiment, includes: a plurality of optical fibers arranged in an array;

and a lens array plate that includes a first principal surface with a plurality of lenses corresponding to the respective optical fibers being formed on this surface, and a second principal surface joined to end faces of the optical fibers so as to be opposed to the first principal surface and optically coupled to the optical fibers to which the respective lenses correspond, wherein at least one of the end faces of the optical fibers and the second principal surface is inclined from a plane perpendicular to optical axes of the optical fibers.

By the optical connector, reduction in return loss at the optical connector connection structure according to the lens scheme can be achieved.

DETAILED DESCRIPTION

1. Overview of Embodiment

Figure 1:
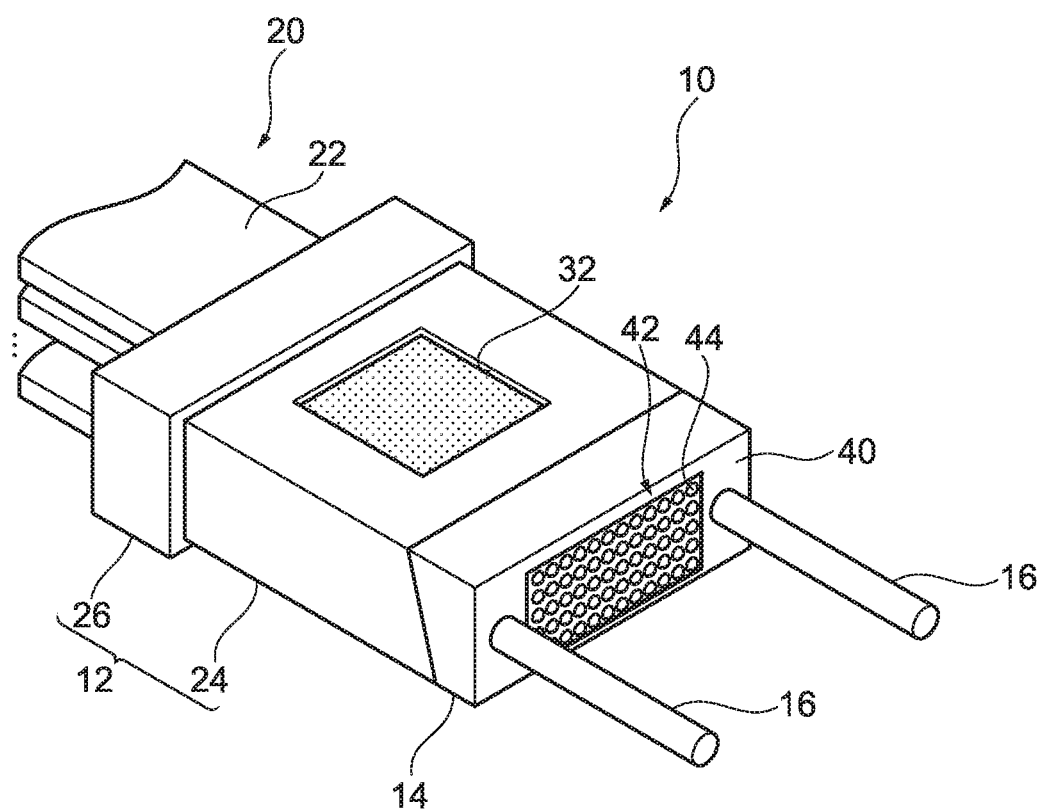
FIG. 1 is a perspective view showing an appearance of an optical connector according to Embodiment 1.

First, an overview of a typical embodiment of the disclosure disclosed in the present application is described. Note that in the following description reference signs in the drawings corresponding to components of the disclosure are described with parentheses, for example.

[1] An optical connector (10, 10A, 10B, 10Bx, 10C, 10D) according to a typical embodiment of this disclosure, includes: a plurality of optical fibers (18) arranged in an array; and a lens array plate (14, 14A, 14B, 14C, 14D, 14Bx) that includes a first principal surface (40, 40A, 40B, 40C, 40D, 40Bx) with a plurality of lenses (44, 44A, 44B, 44Bx) corresponding to the respective optical fibers being formed on this surface, and a second principal surface (41, 41A, 41B, 48Bx, 41D, 41Bx) joined to end faces (180) of the optical fibers so as to be opposed to the first principal surface and optically coupled to the optical fibers to which the respective lenses correspond, wherein at least one of the end faces of the optical fibers and the second principal surface is inclined from a plane (182) perpendicular to optical axes (181) of the optical fibers.

[2] In the optical connector, an inclination angle (θ) of at least one of the end faces of the optical fibers and the second principal surface from the plane (182) may be at least three degrees.

[3] In the optical connector, the end faces of the optical fibers may be respectively disposed substantially at rear focal points (F) of the corresponding lenses.

[4] In the optical connector (10A, 10B), the lenses (44A, 44B) may be disposed in a state of deviating from the optical axes (181) of the optical fibers to which the optical axes (440A, 440B) of the lenses correspond.

[5] In the optical connector (10A), the optical axis (440A) of each of the lenses (44A) may deviate in a direction perpendicular to the optical axis (181) of the corresponding optical fiber.

[6] In the optical connector, deviating amounts of the optical axes of the lenses from the optical axes of the respective optical fibers may be at least 5 μm.

[7] In the optical connector, inclination angles of the optical axes of the lenses from the optical axes of the respective optical fibers may be at least six degrees.

[8] In the optical connector, the optical fibers and the lenses may be configured to transmit light having wavelengths in a range from 1,260 nm to 1,565 nm.

[9] In the optical connector, the optical axes (440B, 440Bx) of the lenses (44B, 44Bx) may be inclined from the optical axes (181) of the corresponding optical fibers.

[10] In the optical connector, inclination angles (4) of the optical axes of the lenses from the optical axes of the respective optical fibers are at least six degrees.

[11] An optical connector connection structure (100A) according to this disclosure, includes two optical connectors (10A) described above, wherein the lenses of one of the optical connectors and the lenses of another of the optical connectors are disposed such that the corresponding lenses face each other, and a deviating direction of the optical axes of the lenses from the optical axes of the optical fibers in the one optical connector is opposite to a deviating direction of the optical axes of the lenses from the optical axes of the optical fibers in the other optical connector.

[12] An optical connector connection structure (100B) according to this disclosure, includes two optical connectors (10B) described above, wherein the lenses of one of the optical connectors and the lenses of another of the optical connectors are disposed such that the corresponding lenses face each other, and a direction of an inclination of the optical axes of the lenses from the optical axes of the optical fibers in the one optical connector is opposite to a direction of an inclination of the optical axes of the lenses from the optical axes of the optical fibers in the other optical connector.

[13] An optical connector connection structure (100) according to this disclosure, includes two optical connectors (10) described above, wherein the lenses of one of the optical connectors and the lenses of another of the optical connectors are disposed such that the corresponding lenses face each other, and the two optical connectors are configured such that optical path lengths in the lens array plates with respect to pairs of the lenses disposed opposite to each other are equal to each other.

[14] In the optical connector connection structure (100A, 100B), the two optical connectors (10A, 10B) are configured such that optical path lengths in the lens array plates with respect to pairs of the lenses disposed opposite to each other are equal to each other.

2. Specific Examples of Embodiments

Hereinafter, specific examples of embodiments of this disclosure will be described with reference to the accompanying drawings. Note that in the following description, components common to the embodiments are assigned the same reference signs, and redundant description is omitted. The drawings are schematic. The relationships between dimensions of components, the ratios of the components and the like are sometimes different from those in actuality. Also between the drawings, parts where the relationships of the mutual dimensions and ratios are different may sometimes be included.

Embodiment 1

Figure 2:
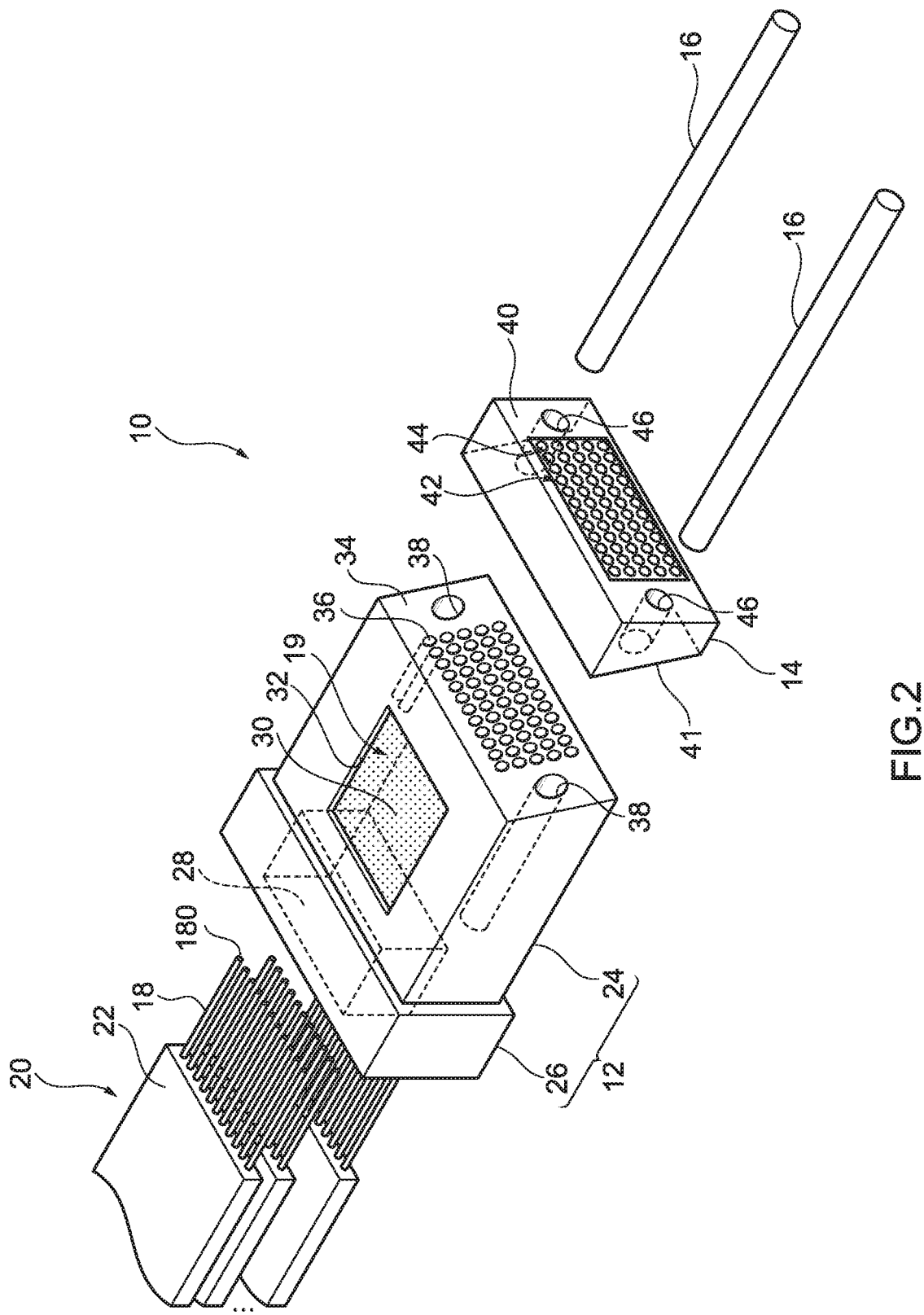
FIG. 2 is an exploded perspective view showing the configuration of the optical connector according to Embodiment 1.

FIG. 1 is a perspective view showing an appearance of an optical connector according to Embodiment 1 of this disclosure. FIG. 2 is an exploded perspective view showing the configuration of the optical connector according to Embodiment 1 of this disclosure.

As shown in FIGS. 1 and 2, the optical connector 10 according to Embodiment 1 is a multicore optical connector that connects optical fibers fixed to the optical connector 10 to respective optical fibers fixed to another optical connector that is a connection target.

Specifically, the optical connector 10 includes a plurality of optical fibers 18, a ferrule 12, a lens array plate 14, and a pair of guide pins 16.

The optical fiber 18 is a quartz-based optical fiber that includes a core 184, and a cladding 185. For example, in the optical connector 10, optical fiber tape core wires 20 prepared by arranging a predetermined number of optical fibers 18 in parallel and integrally coating the fibers with a coat 22 made up of resin, such as ultraviolet-curing resin, are used, and a plurality of layers of the optical fiber tape core wires 20 are stacked and fixed to the ferrule 12.

The optical fibers 18 are, for example, single-mode fibers.

The ferrule 12 is a connector main body that accommodates pluralities of optical fibers 18 arranged in arrays in an aligned manner. The ferrule 12 is made of a mixed material that contains a base material containing resin and used for a typical resin ferrule, and a filler that is a solid material made of a material different from the base material. The ferrule 12 is formed by applying a molding process to the mixed material. A method of molding the ferrule 12 is not specifically limited. For example, a transfer molding method, an injection molding method or the like can be used.

The base material used for the ferrule 12 may contain at least one of a thermoplastic resin, and a thermo-setting resin. As the thermoplastic resin used for the base material of the ferrule 12, for example, polyphenylenesulfide (PPS), liquid crystal polymer (LCP), polyethersulfone (PES), polycarbonate (PC), cycloolefin polymer (COP) or the like may be used. As the thermo-setting resin used for the base material of the ferrule 12, for example, epoxy resin, phenolic resin, urea resin, melamine resin, unsaturated polyester resin or the like may be used.

As the filler used for the ferrule 12, for example, a solid material formed by processing quartz glass or quartz crystal into a predetermined shape may be used. The filler of the ferrule 12 is blended in the base material in order to reduce the linear expansion coefficient of the ferrule 12.

As shown in FIGS. 1 and 2, the ferrule 12 includes a ferrule main body 24, and a flange 26.

The ferrule main body 24 is provided on a connection end side of the optical connector 10, and the flange 26 is provided on the opposite side of the connection end of the optical connector 10. Note that in the following description, the connection end side of the optical connector 10 is called "front" of the optical connector 10 and the opposite side of the connection end of the optical connector 10 is called "rear" of the optical connector 10.

The ferrule 12 is a ferrule for a multicore optical connector. Specifically, the ferrule 12 is an MT (Mechanically Transferable) ferrule, and conforms to or complies with, for example, IEC 61754-5 by International Electrotechnical Commission, JIS C 5981 by Japanese Industrial Standards or the like.

In the flange 26, an optical fiber introduction port 28 for introducing the optical fibers 18 into the ferrule 12 is formed. The optical fiber introduction port 28 is formed in the flange 26 so as to penetrate in the front and rear direction of the optical connector 10.

In the ferrule main body 24, a hollow portion 30 that communicates with the optical fiber introduction port 28 of the flange 26 is formed. An opening 32 communicating with the hollow portion 30 is formed on an upper surface of the ferrule main body 24. The opening 32 is a hole for introducing adhesive 19 that fixes the optical fibers 18 to the ferrule 12 and joins end faces of the optical fibers 18 to the lens array plate 14.

The ferrule main body 24 includes a connection-side end face 34 on the front side of the optical connector 10. Although the details are described later, the connection-side end face 34 is inclined from a plane perpendicular to the front and rear direction of the optical connector 10. A plurality of optical fiber insertion holes 36, into which the respective optical fibers 18 are inserted along the optical axes of the optical fibers, are formed on the connection-side end face 34 of the ferrule main body 24. The optical fiber insertion holes 36 are each formed along the front and rear direction of the optical connector 10. One ends of the optical fiber insertion holes 36 are each open on the connection-side end face 34. The other ends of the optical fiber insertion holes 36 are each open so as to communicate with the hollow portion 30.

The optical fiber insertion holes 36 are arranged in an array. For example, a predetermined number of arrays of optical fiber insertion holes 36 arranged in parallel along the width direction of the optical connector 10 are formed in multiple stages in parallel to the vertical direction of the optical connector 10. In FIG. 2, for example, a case where five stages of arrays of 12 optical fiber insertion holes 36 are formed is shown. Note that the mode of arrangement of the optical fiber insertion holes 36, the total number of optical fiber insertion holes 36, the number of optical fiber insertion holes 36 per array, and the number of stages of arrays of the optical fiber insertion holes 36 can be appropriately configured in accordance with the number of optical fibers 18 and the like. The hole diameter and pitch of the optical fiber insertion holes 36 can be appropriately configured in accordance with the outer diameter and pitch of the optical fibers 18. The number of stages of optical fiber insertion holes 36 is not necessarily multiple stages, and may be one instead.

Note that each optical fiber 18 has an outer diameter (the outer diameter of a glass part made up of a core and a cladding) of 80 to 126 μm. In the optical connector 10, if the outer diameter of the optical fibers 18 is 80 μm, the pitch is, for example, 125 μm or 250 μm, and if the outer diameter of the optical fiber 18 is 125 μm, the pitch is, for example, 250 μm. Note that the pitch is not limited to this, and may be configured to be equal to or larger than the outer diameter of the optical fiber 18.

In the ferrule 12 configured as described above, tip portions of the optical fiber tape core wires 20 are introduced from the optical fiber introduction port 28 of the flange 26 into the hollow portion 30 of the ferrule main body 24. The optical fiber tape core wires 20 are stacked in the vertical direction of the optical connector 10. The optical fiber tape core wires 20 may be protected by being covered and held with a boot or the like at the rear end of the optical connector 10. At the tip portions of the optical fiber tape core wires 20 introduced in the hollow portion 30, the coats 22 are removed, and the end faces 180 of the optical fibers 18 are exposed.

The optical fibers 18 are inserted into the respective optical fiber insertion holes 36 formed in the ferrule main body 24, and these fibers are fixed in the respective holes. The optical fibers 18 inserted into the optical fiber insertion holes 36 on the same array and fixed in these holes are configured to be included in the same optical fiber tape core wires 20.

The optical fibers 18 are bonded and fixed to the optical fiber insertion holes 36 with the adhesive 19 introduced from the opening 32 on the upper surface of the ferrule main body 24. End portions of the optical fiber tape core wires 20 introduced into the hollow portion 30 are bonded and fixed to the ferrule main body 24 with the adhesive 19 introduced from the opening 32. The lens array plate 14 described later is also bonded and fixed to the connection-side end face 34 of the ferrule main body 24 with the adhesive 19.

It is preferable that the refractive index of the adhesive 19 have a value between the refractive index of the optical fibers 18 (cores) and the refractive index of the lens array plate 14. It is preferable that the adhesive 19 be made of a material that becomes transparent to light having a transmission-target wavelength band after being cured.

For example, an epoxy resin adhesive or an acryl resin adhesive may be used as the adhesive 19. Note that the optical fibers 18 inserted into the optical fiber insertion holes 36 and fixed to these holes may be in a state of being covered with resin covers, or in a state with the resin covers being removed.

The end faces of the optical fibers 18 fixed to the optical fiber insertion holes 36 are polished together with the connection-side end face 34 of the ferrule main body 24, and are aligned with the connection-side end face 34.

As described above, the ferrule 12 accommodates the optical fibers 18 such that the optical fibers 18 can be arranged in an array. In the ferrule 12 accommodating the optical fibers 18, a fiber array including the optical fibers 18 is configured.

In the width direction of the optical connector 10, at opposite end portions at the opposite ends with the optical fiber insertion holes 36 and the hollow portion 30 of the ferrule main body 24 intervening between these ends, a pair of guide pin insertion holes 38, into which the respective guide pins 16 are inserted, are formed. The pair of guide pin insertion holes 38 are each formed along the front and rear direction of the optical connector 10.

The lens array plate 14 is attached to the connection-side end face 34 of the ferrule main body 24. The lens array plate 14 is a lens array that includes a plurality of lenses 44 corresponding to the respective optical fibers 18 accommodated in the ferrule 12.

The lens array plate 14 is made of a resin material, such as cycloolefin polymer (COP) or polyetherimide (PEI), or glass, for example. Note that the resin material may contain filler. Note that the lens array plate 14 may be made of a material allowing transmission-target light to propagate, and is not necessarily transparent.

The lens array plate 14 has a lens-side end face 40 serving as a first principal surface where a lens array portion 42 including the lenses 44 corresponding to the respective optical fibers 18 is formed, and a lens rear face 41 serving as a second principal surface opposite to the lens-side end face 40.

The lens-side end face 40 is a surface of the lens array plate 14, the surface being disposed at the front part of the optical connector 10, and is a surface disposed to face another optical connector 10 serving as the connection target when the two optical connectors 10 are connected to each other. More specifically, the lens-side end face 40 is disposed to face the lens-side end face 40 of the lens array plate 14 of the other optical connector 10 serving as the connection target.

In the lens array portion 42, the lenses 44 arranged in an array corresponding to the respective optical fibers 18 arranged on the connection-side end face 34 of the ferrule main body 24 are formed.

The lenses 44 are each configured to have a protruding curved surface on the lens-side end face 40 and allow the direction along the front and rear direction of the optical connector 10 to serve as the optical axis. Each lens 44 may be a spherical lens or an aspherical lens.

The lens rear face 41 is a surface of the lens array plate 14, the surface being disposed at the rear part of the optical connector 10, and is a surface joined with the connection-side end face 34 of the ferrule 12 with the adhesive 19. Specifically, as described later, the lens rear face 41 is a surface inclined from a plane perpendicular to the front and rear direction of the optical connector 10, and is joined with the connection-side end face 34 of the ferrule main body 24 such that each lens 44 can be optically coupled with the corresponding optical fiber 18.

Note that the details of the joining part of the lens array plate 14 and the optical fibers 18 are described later.

As described above, by joining the lens rear face 41 of the lens array plate 14 to the connection-side end face 34 of the ferrule 12, the lenses 44 can function as collimator lenses that collimate, into parallel light, light emitted from the corresponding optical fibers 18 to the lenses 44, and emit the light toward the opposite optical connector with respect to connection. The lenses 44 can also function as condenser lenses that condense the parallel light having entered from the opposite optical connector with respect to connection to the lenses 44, on the end faces of the corresponding optical fibers 18, to allow the condensed light to enter the optical fibers 18.

In the width direction of the optical connector 10, at opposite end portions of the lens array plate 14 at the opposite ends of the lens array portion 42, a pair of guide pin insertion holes 46, into which the respective guide pins 16 are inserted, are formed. The pair of guide pin insertion holes 46 are each formed along the front and rear direction of the optical connector 10. The pair of guide pin insertion holes 46 are formed in conformity with the pair of guide pin insertion holes 38 of the ferrule main body 24.

The lens array plate 14 is fixed to the connection-side end face 34 of the ferrule 12 with the adhesive 19 in a state of being positioned with the pair of guide pins 16, i.e., with respect to the ferrule 12. The guide pins 16 inserted into the guide pin insertion holes 46 and 38 include parts projecting forward of the optical connector 10 from the lens array plate 14 in order to be inserted into the opposite optical connector with respect to connection in an analogous manner and to be connected.

As described above, the optical connector 10 that includes the optical fibers 18 accommodated in and fixed to the ferrule 12 is achieved.

Thereafter, the joining part of the lens array plate 14 and the optical fibers 18 are described in detail.

Figure 3:
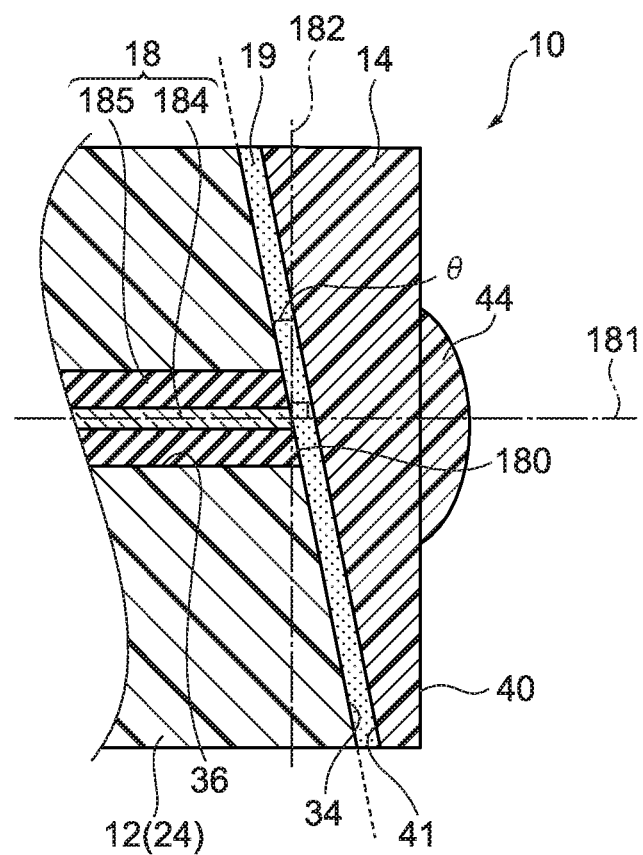
FIG. 3 is a diagram for schematically showing a joining part between an optical fiber and a lens array plate in the optical connector according to Embodiment 1.

FIG. 3 schematically is a diagram showing the joining part between the optical fibers 18 and the lens array plate 14 in the optical connector 10 according to Embodiment 1. In this diagram, for example, one optical fiber 18 among the optical fibers 18 fixed to the ferrule 12 is typically shown.

As shown in this diagram, the lens rear face 41 of the lens array plate 14 is joined to the connection-side end face 34 of the ferrule 12 (ferrule main body 24) and the end face 180 of each optical fiber 18 via the adhesive 19. Note that, although not shown, the adhesive 19 is filled also in a gap between the inner wall of the optical fiber insertion holes 36 of the ferrule 12 and the optical fiber 18.

As shown in FIG. 3, the joining surfaces of the optical fibers 18 and the lens array plate 14 are not perpendicular to the optical axis 181 of each optical fiber 18. That is, the joining surfaces of the optical fibers 18 and the lens array plate 14 are inclined from a plane 182 perpendicular to the optical axis 181 of each optical fiber 18.

Here, the joining surfaces between the optical fibers 18 and the lens array plate 14 are the end face 180 of each optical fiber 18 and the lens rear face 41 of the lens array plate 14, which are joined to each other via the adhesive 19.

That is, the end faces 180 of the optical fibers 18 are inclined from the plane 182 perpendicular to the optical axes 181 of the optical fibers 18, and the lens rear face 41 is inclined from the plane 182. Here, the inclination angle of the end faces 180 of the optical fibers 18 from the plane 182, and the inclination angle of the lens rear face 41 from the plane 182 are identical to each other.

Provided that the inclination angle of the end faces 180 of the optical fibers 18 from the plane 182 (the inclination angle of the lens rear face 41 from the plane 182) is θ [degrees(°)], 0°<θ<90° holds. Preferably, θ≥3° holds.

According to specific examples, to cause the rate of coupling of reflected light at the joining surfaces of the lens array plate 14 and the optical fibers 18 into the optical fibers 18, that is, the return loss at the joining surfaces of the lens array plate 14 and the optical fibers 18, to be equal to or lower than −45 dB, θ≥3° is preferable if the lens array plate 14 is made of COP (refractive index n=1.51), and θ≥6° is preferable if the lens array plate 14 is made of PEI (refractive index n=1.66). Irrespective of the material of the lens array plate 14, θ=8° may be adopted.

Thereafter, the positional relationship between the lenses 44 and the end faces 180 of the optical fibers 18 is described.

Figure 4:
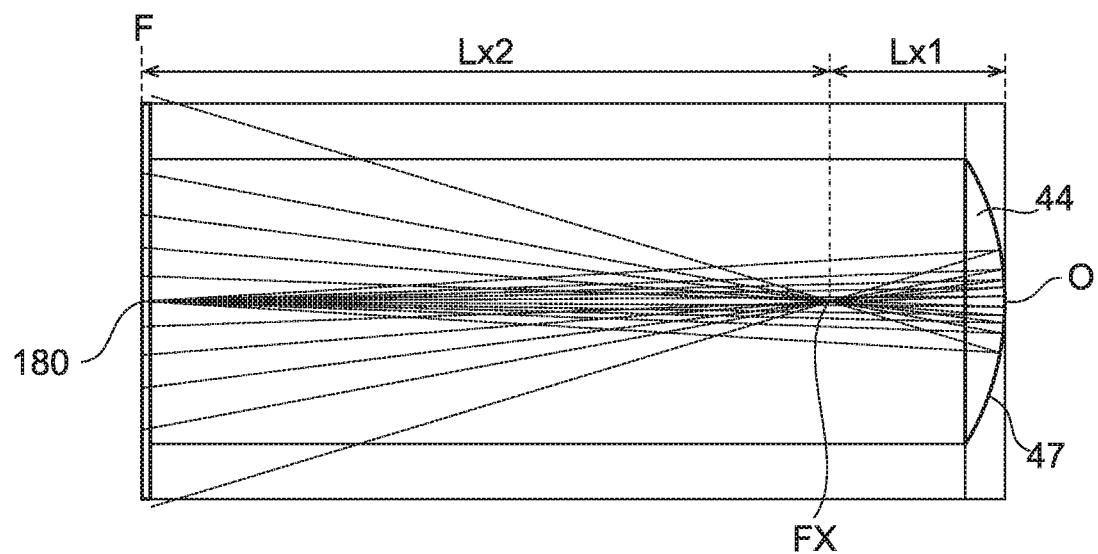
FIG. 4 is a diagram for illustrating the positional relationship between a lens and an end face of the optical fiber in the optical connector according to Embodiment 1.

FIG. 4 is a diagram for illustrating the positional relationship between the lenses 44 and the end faces 180 of the optical fibers 18 in the optical connector 10 according to Embodiment 1.

As shown in FIG. 4, the end faces 180 of the optical fibers 18 are respectively disposed substantially on the rear focal points F of the corresponding lenses 44, and deviate from points FX on which reflected light by the protruding surfaces 47 of the lenses 44 is focused, in the direction of the optical axes 181 of the optical fibers 18 (defocus). For example, the end face 180 of each optical fiber 18 is disposed far rearward in the optical connector 10 than the point FX on which the reflected light by the corresponding lens 44 is focused. Preferably, if the distance between the tip portion (hereinafter, also called "lens apex") O of the protruding surface 47 of the lens 44 and the point FX on which the reflected light by the lens 44 is focused is assumed as Lx1, and the distance between the end face 180 of the optical fiber 18 and the point FX on which the reflected light by the lens 44 is focused is assumed as Lx2, Lx2≥3Lx1 holds.

According to this, the end face 180 that is the light receiving surface of the optical fiber 18 is apart from the rear focal point F of the lens 44. Consequently, the rate of coupling of the reflected light by the protruding surfaces 47 of the lenses 44 into the optical fibers 18 can be reduced.

Note that in the optical connector 10 according to Embodiment 1, in a case where anti-reflective (AR) coating is applied to the lenses 44, the return loss can be equal to or less than −45 dB. However, it is preferable that for a certain usage, the optical connector 10 be configured to support the optical communication wavelength band from the O band to C band (from 1,260 nm to 1,565 nm), for example.

Thereafter, a method of joining the optical fibers 18 and the lens array plate 14 in the optical connector 10 according to Embodiment 1 is described. Here, two methods are exemplified as the method of joining the optical fibers 18 and the lens array plate 14.

Figure 5A:
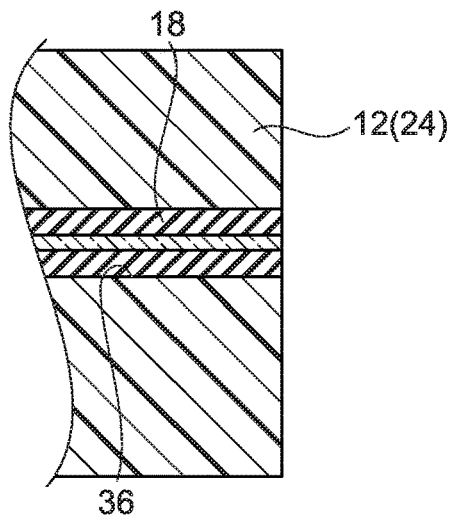
FIG. 5A is a diagram showing an example of a method of joining the optical fiber and the lens array plate in the optical connector according to Embodiment 1.
Figure 5B:
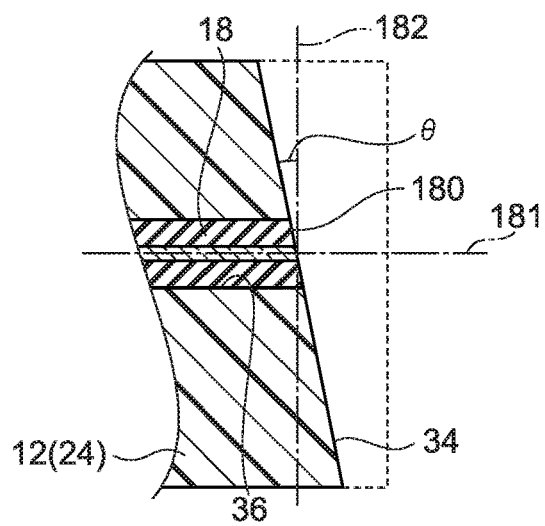
FIG. 5B is a diagram showing an example of the method of joining the optical fiber and the lens array plate in the optical connector according to Embodiment 1.
Figure 5C:
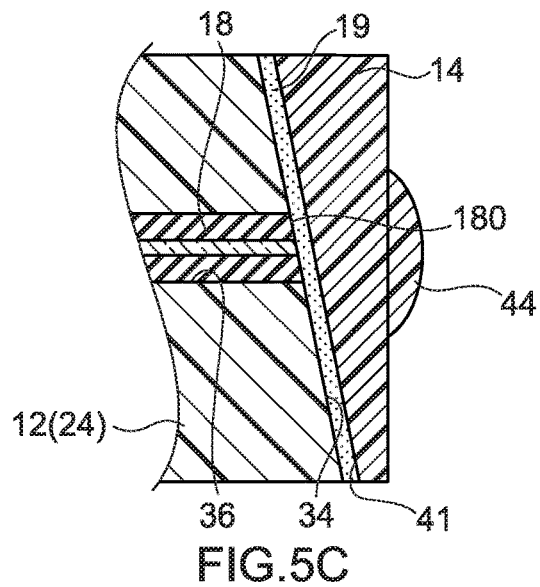
FIG. 5C is a diagram showing an example of the method of joining the optical fiber and the lens array plate in the optical connector according to Embodiment 1.

FIGS. 5A to 5C are diagrams showing an example of the method of joining the optical fibers 18 and the lens array plate 14 in the optical connector 10 according to Embodiment 1.

First, as shown in FIG. 5A, the ferrule 12 where the optical fiber insertion holes 36 are formed is prepared, and the optical fibers 18 are inserted into and fixed to the respective optical fiber insertion holes 36 of the ferrule 12 (step S11). For example, in a state where the optical fibers 18 are inserted into the respective optical fiber insertion holes 36, fixation is performed by pouring the adhesive 19 into the gaps between the optical fiber insertion holes 36 and the optical fibers 18.

Thereafter, as shown in FIG. 5B, one end faces of the ferrule 12 where the optical fibers 18 are fixed are polished (step S12). Specifically, the ferrule 12 is polished by a publicly known polishing technique such that the connection-side end face 34 of the ferrule 12 can be non-perpendicular to the optical axes 181 of the optical fibers 18. At this time, the inclination angle θ of the connection-side end face 34 of the ferrule 12 from the plane 182 perpendicular to the optical axes 181 of the optical fibers 18 may be set to an appropriate value in conformity with the material forming the lens array plate 14, as described above.

Thereafter, as shown in FIG. 5C, the lens array plate 14, with the lens rear face 41 having been polished to be inclined in a manner analogous to that of the ferrule 12, is prepared, and the lens rear face 41 of the lens array plate 14 and the connection-side end face 34 of the ferrule 12 are joined with the adhesive 19 (step S13). At this time, the ferrule 12 and the lens array plate 14 are joined such that the end faces 180 of the optical fibers 18 cemented and fixed to the ferrule 12 and the corresponding lenses 44 can face each other.

According to the processing steps described above, the joining part between the optical fibers 18 and the lens array plate 14 in the optical connector 10 according to Embodiment 1 can be achieved.

FIGS. 6A to 6D are diagrams showing another example of the method of joining the optical fibers 18 and the lens array plate 14 in the optical connector 10 according to Embodiment 1.

Figure 6A:
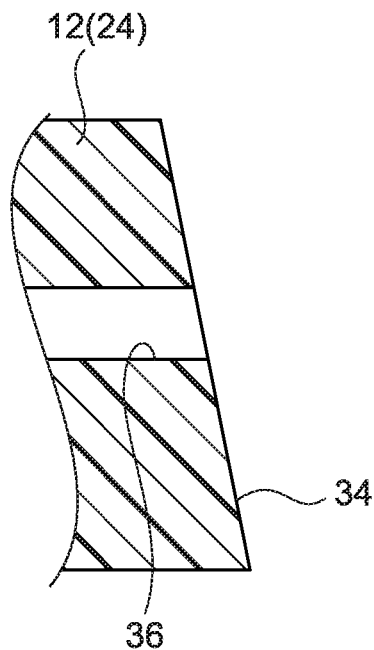
FIG. 6A is a diagram showing another example of the method of joining the optical fiber and the lens array plate in the optical connector according to Embodiment 1.

First, as shown in FIG. 6A, the ferrule 12 where the optical fiber insertion holes 36 are formed is prepared, and the one end faces of the ferrule 12 are polished by the publicly known polishing technique (step S21). The polishing method is analogous to that in step S12 described above.

Figure 6B:
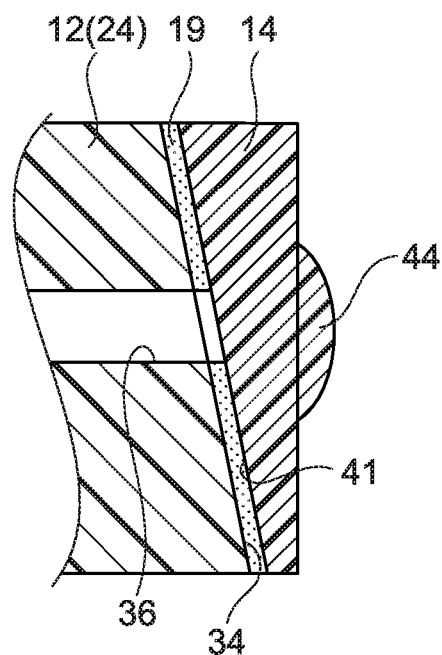
FIG. 6B is a diagram showing the other example of the method of joining the optical fiber and the lens array plate in the optical connector according to Embodiment 1.

Thereafter, as shown in FIG. 6B, the lens array plate 14, with the lens rear face 41 having been polished to be inclined in a manner analogous to that of the ferrule 12, is prepared, and the lens rear face 41 of the lens array plate 14 and the connection-side end face 34 of the ferrule 12 are joined with the adhesive 19 (step S22). At this time, the ferrule 12 and the lens array plate 14 are joined such that the optical fiber insertion holes 36 of the ferrule 12 and the corresponding lenses 44 can face each other.

Figure 6C:
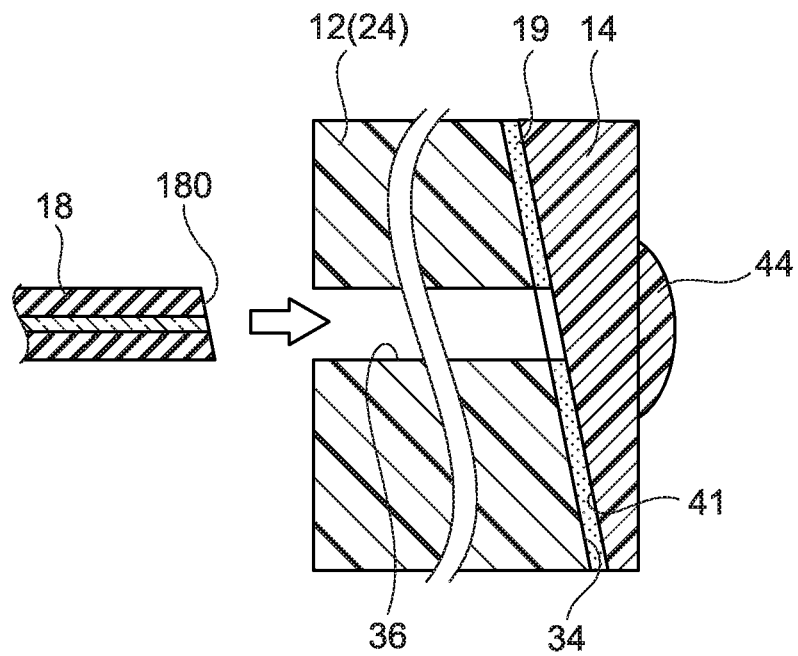
FIG. 6C is a diagram showing the other example of the method of joining the optical fiber and the lens array plate in the optical connector according to Embodiment 1.

Thereafter, as shown in FIG. 6C, in a manner analogous to that of the ferrule 12, the optical fibers 18 with one end faces 180 having been polished in an inclined manner are prepared, and the optical fibers 18 are respectively inserted into the corresponding optical fiber insertion holes 36 of the ferrule 12 (step S23).

Figure 6D:
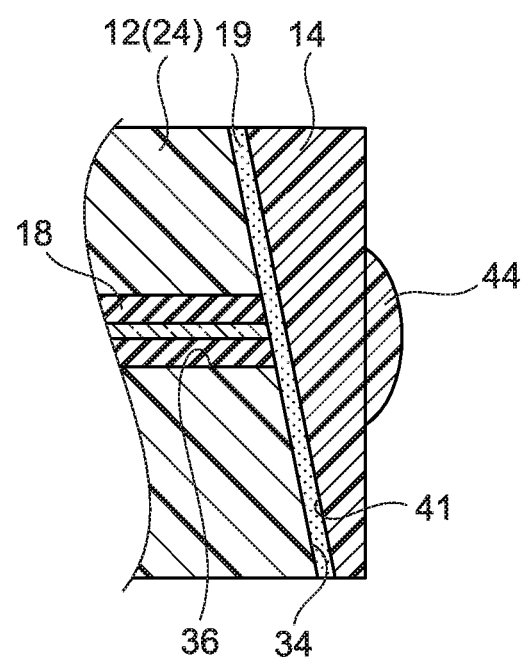
FIG. 6D is a diagram showing the other example of the method of joining the optical fiber and the lens array plate in the optical connector according to Embodiment 1.

Thereafter, as shown in FIG. 6D, the optical fibers 18 are respectively cemented and fixed to the lens rear face 41 of the lens array plate 14 with the adhesive 19 (step S24).

According to the processing steps described above, the joining part between the optical fibers 18 and the lens array plate 14 in the optical connector 10 according to Embodiment 1 can be achieved.

Figure 7:
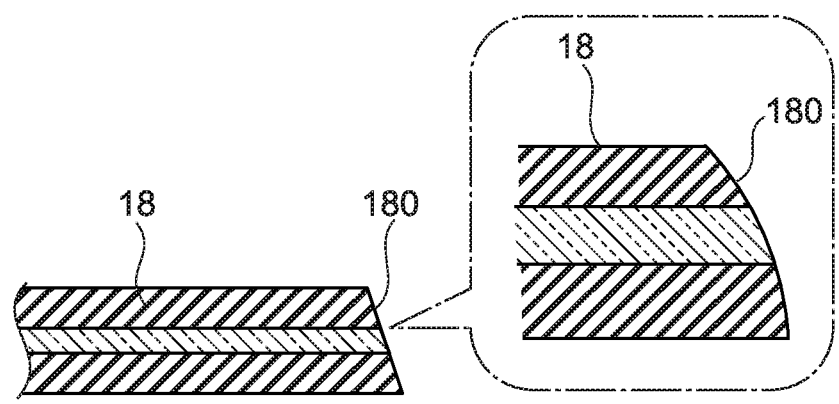
FIG. 7 is a diagram showing another example of an optical fiber used for the joining method shown in FIGS. 6A to 6D.

Note that in the latter method of joining described above (FIGS. 6A to 6D), as shown in FIG. 7, for example, optical fibers 18 whose one ends are cut by melting using a laser cleaver (or laser cutter) may be used. Cut surfaces (end faces 180) of the optical fibers 18 are caused to have rounded shape due to heat during melting. A laser of the laser cleaver is, typically, a laser with wavelengths absorbable by optical fibers, such as a $CO_2$ laser or an ultraviolet laser.

Here, the end faces 180 of the optical fibers 18 are surfaces contacting the centers of cores 184.

Thereafter, an optical connector connection structure using the optical connectors 10 according to Embodiment 1 is described.

Figure 8:
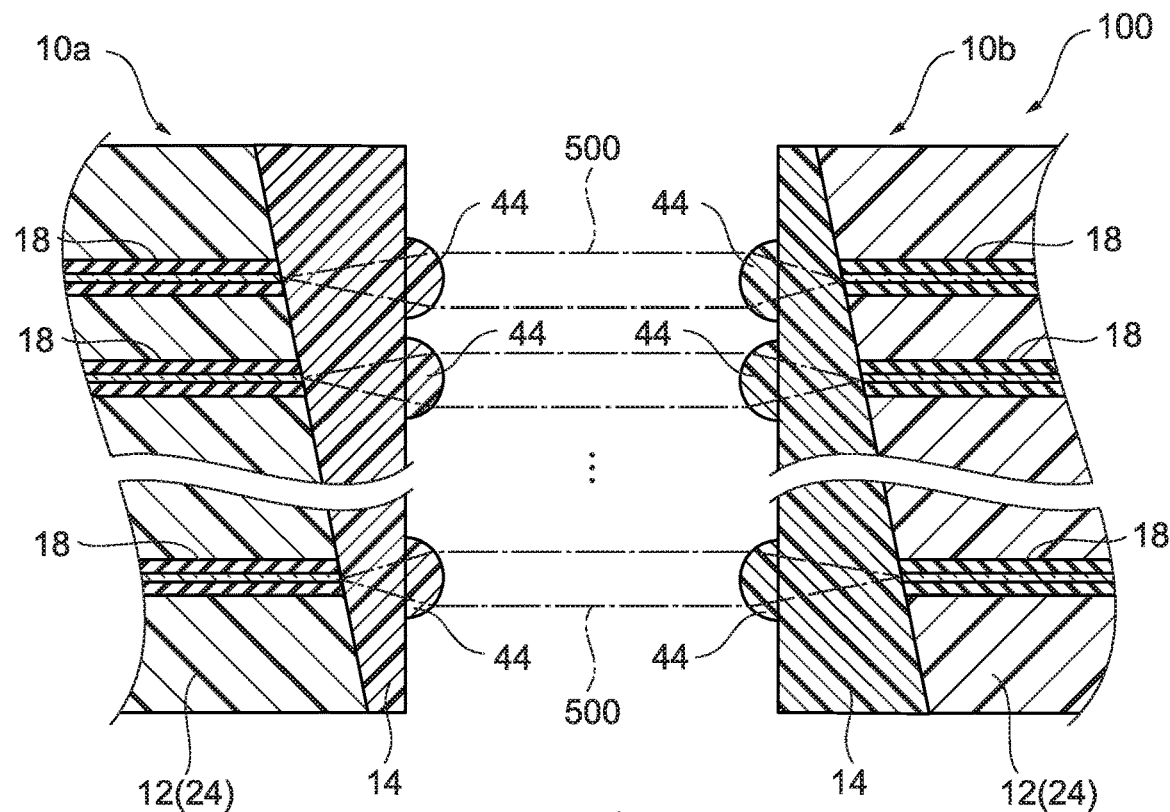
FIG. 8 is a diagram showing an optical connector connection structure using the optical connectors according to Embodiment 1.
Figure 9:
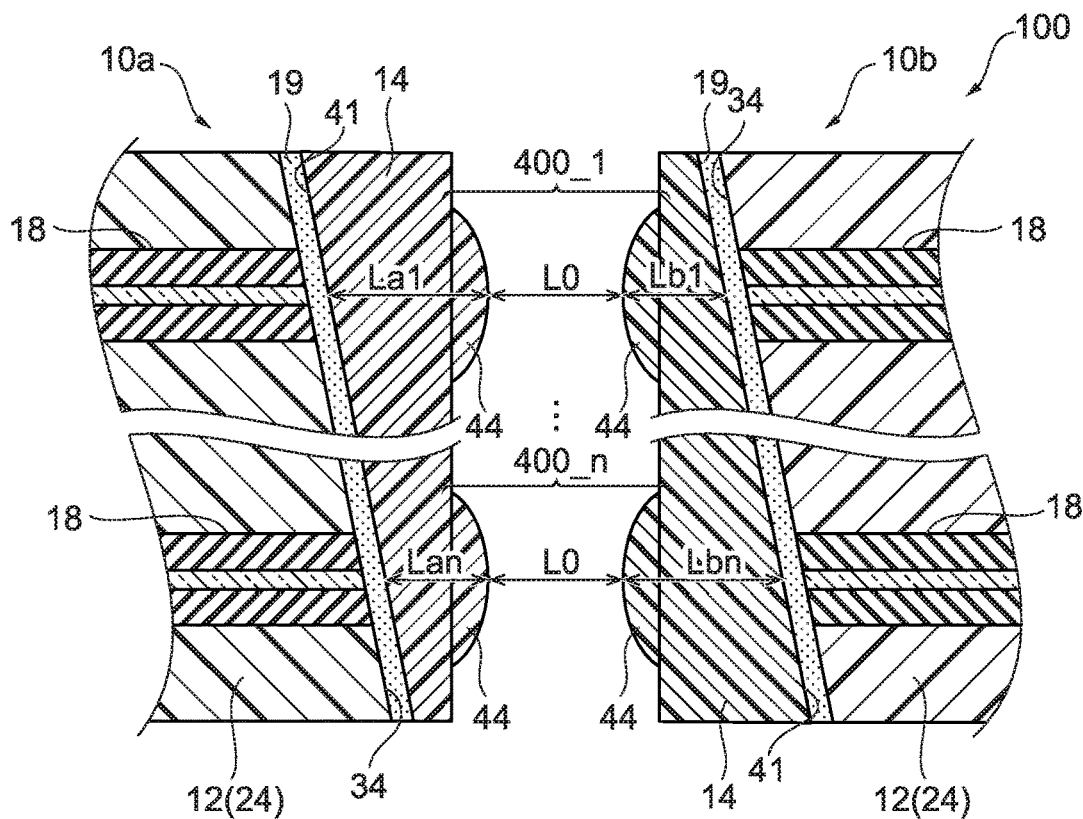
FIG. 9 is an enlarged diagram of connection parts of two optical connectors in the optical connector connection structure shown in FIG. 8.

FIG. 8 is a diagram showing the optical connector connection structure using the optical connectors 10 according to Embodiment 1. FIG. 9 is an enlarged diagram of joining parts of the two optical connectors in the optical connector connection structure shown in FIG. 8. In FIGS. 8 and 9, one of the two optical connectors 10 is represented as an optical connector 10a, and the other is represented as an optical connector 10b.

As shown in FIGS. 8 and 9, in the optical connector connection structure 100, the two optical connectors 10a and 10b allow the lenses 44 of one optical connector 10a and the lenses 44 of the other optical connector 10b to be disposed to face each other.

As shown in FIG. 9, in the optical connector connection structure 100, the two optical connectors 10a and 10b are disposed apart from each other such that the inter-lens-end distance L0 between the lens apexes of the lenses 44 of the one optical connector 10a and the lens apexes of the lenses 44 of the other optical connector 10b can have an appropriate value. For example, in the optical connector connection structure 100, the two optical connectors 10a and 10b are disposed apart from each other such that the inter-lens-end distance L0 can be twice as long as the front focal length of the lens 44.

In the optical connector connection structure 100, the two optical connectors 10a and 10b are arranged such that the optical path lengths in the lens array plates 14 per pair of lenses 44A disposed to face each other (hereinafter, also represented as "lens pair 400") can be equal to each other.

For example, as shown in FIG. 9, if the optical path length of the lens pair 400_1 in the lens array plate 14 in the optical connector 10a is assumed as La1, the optical path length of the lens pair 400_1 in the lens array plate 14 in the optical connector 10b is assumed as Lb1, the optical path length of the lens pair 400_n (n is an integer equal to or more than one) in the lens array plate 14 in the optical connector 10a is assumed as Lan, and the optical path length of the lens pair 400_n in the lens array plate 14 in the optical connector 10b is assumed as Lbn, the total (La1+Lb1) of the optical path lengths of the lens pair 400_1 in the two lens array plates 14, and the total (Lan+Lbn) of the optical path lengths of the lens pair 400_n in the two lens array plates 14 satisfies the relationship (La1+Lb1)=(Lan+Lbn).

In the optical connector connection structure 100, the two optical connectors 10 are fixed to each other in a state where the inter-lens-end distance L0 described above is kept. In this case, as shown in FIG. 10, a spacer 200 may be disposed between the one optical connector 10 and the other optical connector 10.

Figure 10:
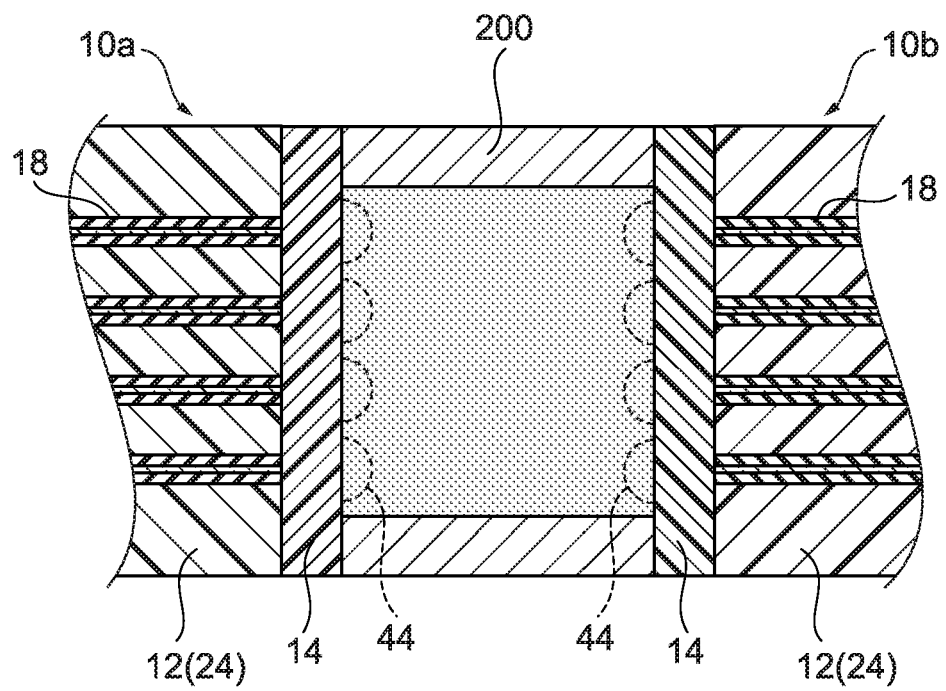
FIG. 10 is a diagram showing an optical connector connection structure with a spacer being disposed between two optical connectors according to Embodiment 1.
Figure 11:
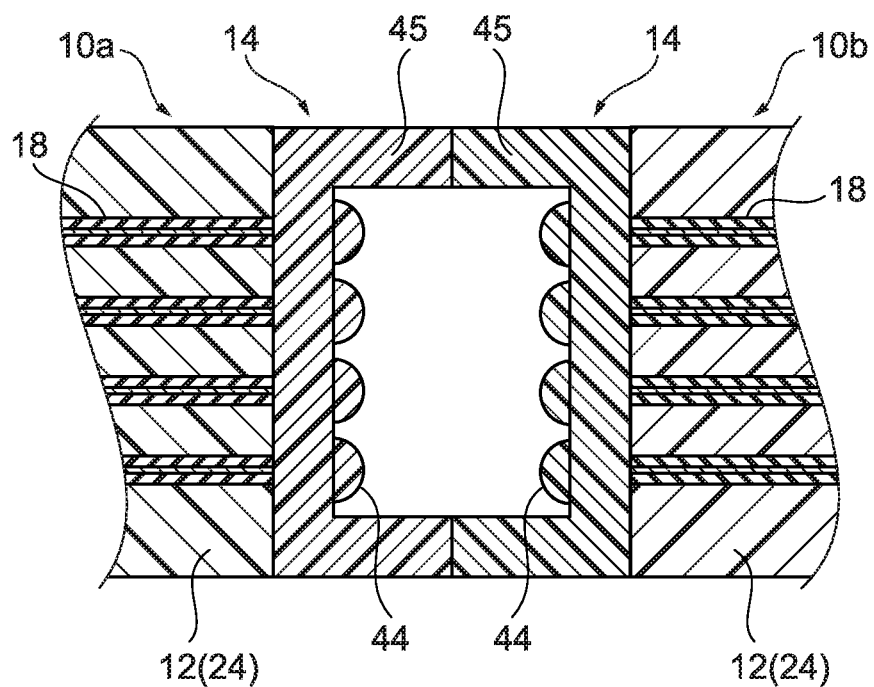
FIG. 11 is a diagram showing an optical connector connection structure that causes parts of lens array plates to function as a spacer.

Here, as shown in FIG. 10, the spacer 200 may be configured as a member separated from the lens array plate 14 of the optical connector 10, or be configured to be integrated with the lens array plate 14. For example, as shown in FIG. 11, the lens array plate 14 may be allowed to have a function as a spacer, by forming a projecting portion 45 that projects forward of the optical connector 10 from the lenses 44, on the lens-side end face 40 of each lens array plate 14, and by disposing the projecting portions 45 of the two optical connectors 10 to face each other and fixing these portions to each other.

By means of the optical connector connection structure 100 according to Embodiment 1, as shown in FIG. 8, at the one optical connector 10, light emitted from the optical fibers 18 is collimated to parallel light 500 and emitted toward the other optical connector 10, and at the other optical connector 10, the parallel light 500 having entered from the one optical connector 10 is condensed on the end faces of the corresponding optical fibers 18 and enters the optical fibers 18.

Here, the optical connector connection structure 100 may have a configuration where the two optical connectors 10 are connected in a state of being accommodated in connector housings, such as for MPO (Multifiber Push-On) connectors. Hereinafter, a case where the two optical connectors 10 are connected in the mode of being accommodated in the connector housings for MPO connectors is described in detail.

Figure 12:
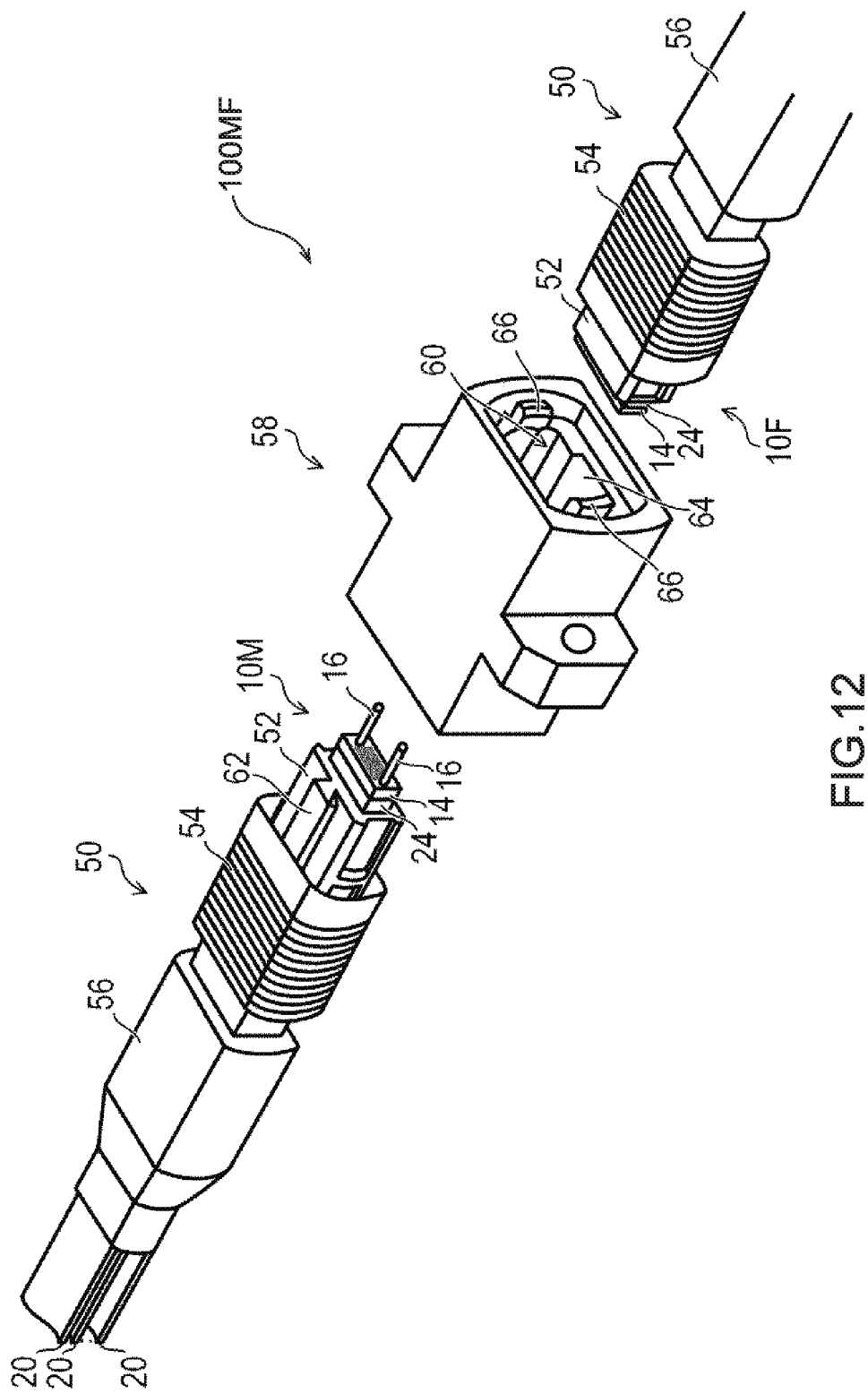
FIG. 12 is a perspective view showing an optical connector connection structure in a case where two optical connectors according to Embodiment 1 are connected to each other in a mode of being accommodated in connector housings for MPO connectors.

FIG. 12 is a perspective view showing the optical connector connection structure in the case where the two optical connectors according to Embodiment 1 are connected to each other in the mode of being accommodated in the connector housing of an MPO connector.

In the optical connector connection structure 100MF, among the two optical connectors 10, one male optical connector 10M is represented as such, and the other female optical connector 10F is represented as such. Here, the MPO connector conforms to or complies with, for example, IEC 61754-7 by International Electrotechnical Commission, JIS C 5964-7 or JIS C 5982 by Japanese Industrial Standards or the like.

In the optical connector connection structure 100MF shown in FIG. 12, the male optical connector 10M and the end portions of the optical fiber tape core wires 20 connected to this connector are accommodated in the connector housing 50 for the MPO connector. The connector housing 50 includes a housing main body 52, a tubular portion 54 provided slidably to the housing main body 52 around the outer periphery of this housing main body 52, and a boot portion 56 connected to the rear end of the housing main body 52.

The housing main body 52 accommodates and holds the optical connector 10M. At the front end that is on the connection side of the housing main body 52, the lens array plate 14 and a part of the ferrule main body 24 of the optical connector 10M protrude. In the housing main body 52 and the boot portion 56, an urging mechanism that includes an elastic body, such as a coil spring, and is not shown is provided. By the urging mechanism, the optical connector 10M is urged forward.

The optical fiber tape core wires 20, which each include the optical fibers 18 fixed to the optical connector 10M, are accommodated in the boot portion 56. The optical fiber tape core wires 20 may be internally included in a cable, a cord or the like.

As with the male optical connector 10M described above, the female optical connector 10F is also accommodated in the connector housing 50 for the MPO connector.

The optical connectors 10M and 10F accommodated in the connector housings 50 are connected to each other via an adapter 58.

The adapter 58 is formed to allow a housing insertion hole 60 to penetrate. The housing insertion hole 60 is configured to allow the front ends of the housing main bodies 52 to be inserted from the opposite ends.

At one end side part of the housing insertion hole 60, a recessed part 64 in conformity with a key 62 serving as a projecting portion formed on the housing main body 52 that accommodates the male optical connector 10M is formed. At the other end side part of the housing insertion hole 60, a recessed part 64 in conformity with a key 62 serving as a projecting portion formed on the housing main body 52 that accommodates the female optical connector 10F is formed. Accordingly, it is configured that into the housing insertion hole 60, the front end of the housing main body 52 that accommodates the male optical connector 10M from the one end side is inserted, and the housing main body 52 that accommodates the female optical connector 10F from the other end side is inserted. In FIG. 12, only for the housing main body 52 that accommodates the male optical connector 10M, the key 62 is shown, and only for the other end side part of the housing insertion hole 60, the recessed part 64 is shown.

At the one end side part of the housing insertion hole 60, hook portions 66 that are detachably hooked on the housing main body 52 accommodating the male optical connector 10M to fix this housing main body 52 are formed. At the other end side part of the housing insertion hole 60, hook portions 66 that are detachably hooked on the housing main body 52 accommodating the female optical connector 10F to fix this housing main body 52 are formed. By these hook portions 66, the housing main body 52 accommodating the male optical connector 10M inserted from the one end side into the housing insertion hole 60, and the housing main body 52 accommodating the female optical connector 10F are detachably fixed to the adapter 58. Note that in FIG. 12, only for the other end side part of the housing insertion hole 60, the hook portions 66 are shown.

For connection of the optical connectors 10M and 10F, from the one end side and the other end side of the housing insertion hole 60, the housing main bodies 52 and 52 accommodating the optical connectors 10M and 10F respectively are inserted into the housing insertion hole 60. Then, the housing main bodies 52 are each detachably fixed to the adapter 58 as described above. Meanwhile, in the housing insertion hole 60, the pair of guide pins 16 and 16 of the male optical connector 10M are respectively inserted into the guide pin insertion holes 38 and 46 of the female optical connector 10F, are precisely positioned, and are fixed.

For example, as shown in FIG. 11, in the case where the lens array plate 14 has the shape integral with the spacer, the optical connector 10M and the optical connector 10F contact each other in the housing insertion hole 60, and the projecting portions 45 of their lens array plates 14 contact each other.

The optical connectors 10M and 10F are urged forward by the respective urging mechanisms described above. Accordingly, the projecting portions 45 of the lens array plates 14 of the optical connectors 10M and 10F are in close contact and abut on each other.

As described above, the optical connector 10M and the optical connector 10F accommodated in the connector housing 50 for the MPO connector are connected to each other via the adapter 58.

According to the optical connector connection structure 100MF described above, since the lens surfaces of the optical connectors 10M and 10F are of a non-contact lens scheme, the pressing forces of the optical connectors 10M and 10F can be constant irrespective of the number of cores of the optical fibers 18 in comparison with the PC scheme, and may have requisite minimum magnitudes. Since the optical connector connection structure 100MF requires lenses in terms of the structure, the dimensions of the MT ferrule and the lenses in the longitudinal direction are larger than those according to the PC scheme.

In the optical connector connection structure 100MF, the lengths or spring constants of springs used for the connector housings may be adjusted so as to have pressing forces identical to those of the typical MPO connectors. Furthermore, according to the optical connector connection structure 100MF, the MT ferrule may be configured to be short such that the total longitudinal dimension of the MT ferrule as the ferrule 12 and the lens array plate 14 can have a desired value (or as with the conventional case).

As described above, in the optical connector 10 according to Embodiment 1, the joining surfaces of the end faces 180 of the optical fibers 18 arranged in an array and the lens rear face 41 of the lens array plate 14 where the lenses 44 corresponding to the respective optical fibers 18 are formed are not perpendicular to the optical axes of the optical fibers 18. That is, since the end face 180 of the optical fiber 18 and the lens rear face 41 of the lens array plate 14 are inclined from the plane 182 perpendicular to the optical axes 181 of the optical fibers 18, the principal axes of light reflected by the end faces 180 and the lens rear face 41 are inclined from the optical axes 181 of the optical fibers 18. Accordingly, the rate of coupling of the light reflected by the end faces 180 and the lens rear face 41 into the optical fibers 18 can be reduced.

Consequently, according to the optical connector connection structure 100 including the optical connectors 10 according to Embodiment 1, the return loss during light transmission can be reduced in comparison with that of the optical connector connection structure according to the lens scheme including conventional optical connectors.

In the optical connector 10 according to Embodiment 1, the end faces 180 of the optical fibers 18 are respectively disposed substantially on the rear focal points F of the corresponding lenses 44. That is, since the end faces 180 of the optical fibers 18 deviate from the points FX where light reflected by the corresponding lenses 44 is condensed, in the direction of the optical axes 181 of the optical fibers 18, the rate of coupling of the light reflected by the protruding surfaces 47 of the lenses 44 into the optical fibers 18 can be reduced. For example, the light reflected by the protruding surfaces 47 of the lenses 44 decreases by about 15 dB and is coupled into the optical fibers 18. For example, in a case where the reflection by the protruding surfaces 47 of the lenses 44 is assumed as −12 dB, the rate of coupling into the optical fibers 18 is about −27 dB.

In the optical connector 10 according to Embodiment 1, by applying anti-reflective coating onto the protruding surfaces 47 of the lenses 44 on the lens array plate 14, the return loss can be further reduced. For example, in a case where the multilayer anti-reflective coating is applied to the protruding surfaces 47 of the lenses 44, the reflection by the protruding surfaces 47 of the lenses 44 in a band of ±40 nm centered on 1310 nm can be equal to or less than −40 dB, and the coupling of the light reflected by the protruding surfaces 47 of the lenses 44 into the optical fibers 18 can be equal to or less than −55 dB, for example.

Note that in the optical connector 10 according to Embodiment 1, if the linear expansion coefficients of the ferrule 12 and the lens array plate 14 are different from each other, the optical axes of the optical fibers 18 fixed to the ferrule 12 and the optical axes of the lenses 44 deviate from each other owing to change in temperature, there is a possibility that the return loss of the optical connector 10 varies owing to change in temperature.

It is desirable that in the optical connector 10, the materials of the ferrule 12 and the lens array plate 14 be selected so as to have a small linear expansion coefficient difference between the ferrule 12 and the lens array plate 14. For example, it is preferable to adjust (for example, reduce) the mixing amount of filler (for example, quartz glass) to be mixed with the base material (for example, polyphenylenesulfide (PPS)) of the ferrule 12 such that the linear expansion coefficient difference between the ferrule 12 and the lens array plate 14 can be equal to or lower than 20 ppm/° C.

Alternatively, in the optical connector 10, the ferrule 12 and the lens array plate 14 may be formed of the same material. As the material described above, cycloolefin polymer (COP, linear expansion coefficient: 70 ppm/° C.), polyetherimide (PEI, linear expansion coefficient: 56 ppm/° C.), polycarbonate (PC, linear expansion coefficient: 70 ppm/° C.) or the like can be exemplified.

Embodiment 2

Figure 13:
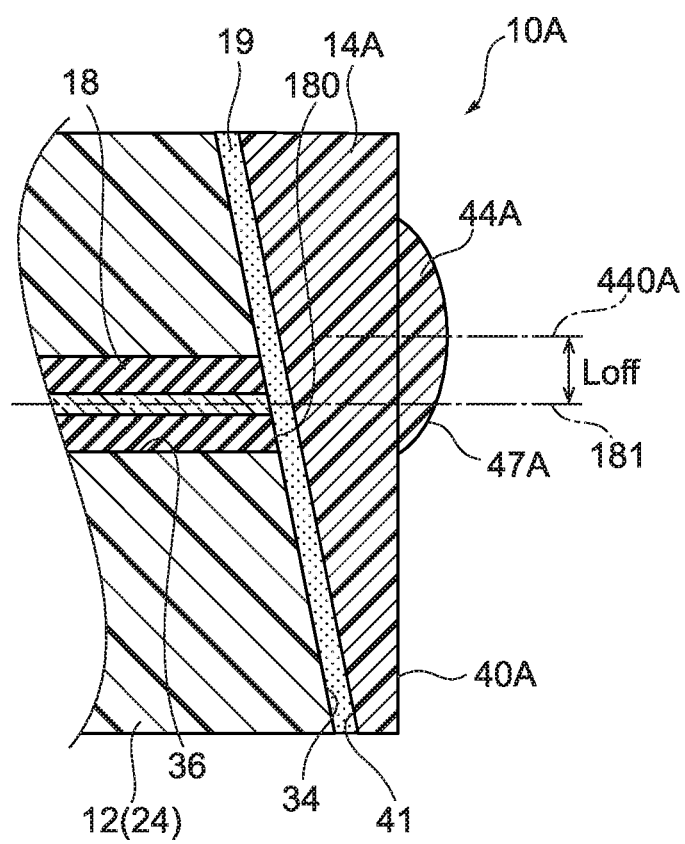
FIG. 13 is a diagram showing a configuration of an optical connector according to Embodiment 2.

FIG. 13 is a diagram showing a configuration of an optical connector 10A according to Embodiment 2. In this diagram, the joining part between the optical fibers 18 and the lens array plate 14A in the optical connector 10A according to Embodiment 2 are schematically shown. Note that in FIG. 13, for example, one optical fiber 18 among the optical fibers 18 fixed to the ferrule 12, and one lens 44A corresponding to this fiber are typically shown.

The optical connector 10A according to Embodiment 2 is different from the optical connector 10 according to Embodiment 1 in that the optical axes 440A of the lenses 44A deviate from the optical axes 180A of the corresponding optical fibers 18, but is analogous to the optical connector 10 according to Embodiment 1 in other points.

Specifically, in the optical connector 10A, the optical axes 440A of the lenses 44A formed on the lens-side end face 40 of the lens array plate 14A deviate (are offset) in a direction perpendicular to the optical axes 181 of the corresponding optical fibers 18.

Provided that the deviating amount (offset length) of the optical axes 440A of the lenses 44 from the optical axes 181 of the optical fibers 18 in the perpendicular direction is Loff, it is preferable that Loff≥5 µm.

Figure 14:
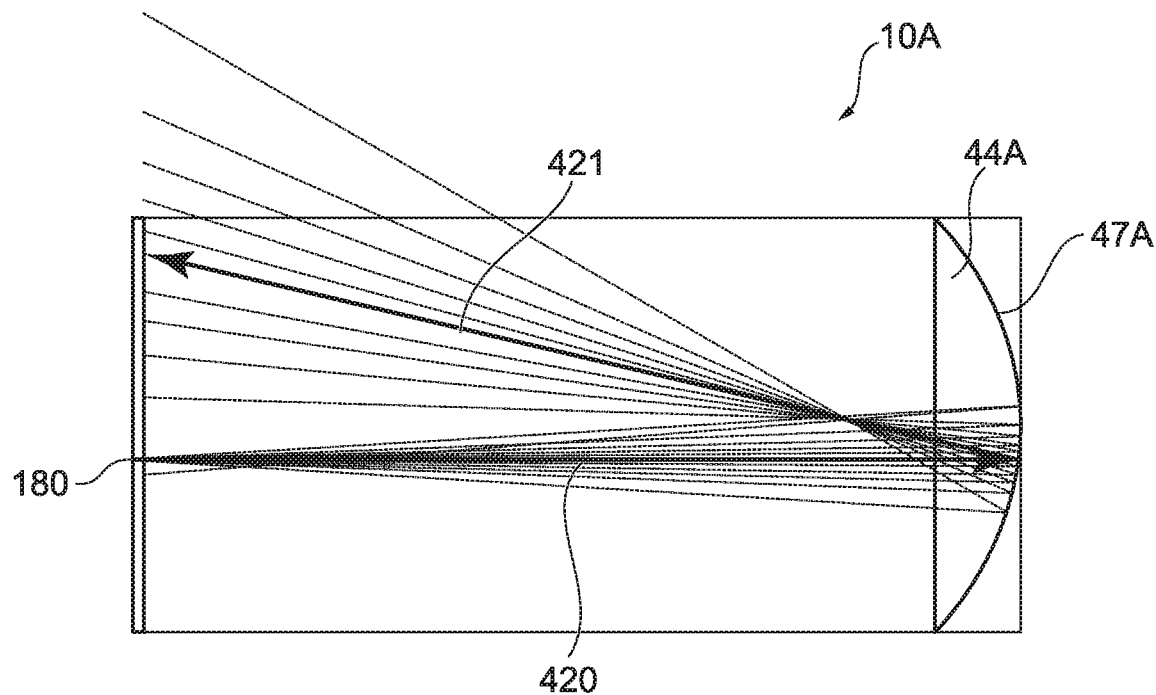
FIG. 14 is a diagram for illustrating propagation of light in the optical connector according to Embodiment 2.

FIG. 14 is a diagram for illustrating propagation of light in the optical connector 10A according to Embodiment 2.

As shown in FIG. 13, in the optical connector 10A, the optical axes 440A of the lenses 44A are offset from the optical axes 181 of the optical fibers 18. Accordingly, as shown in FIG. 14, if a part of light having entered the lens array plate 14A from the optical fibers 18 is reflected by the protruding surfaces 47A of the lenses 44A, the principal axis 421 of the reflected light is inclined from the principal axis 420 of the light having not been reflected yet. Accordingly, the rate of coupling of the reflected light by the protruding surfaces 47A of the lenses 44A into the optical fibers 18 can be reduced.

Thereafter, an optical connector connection structure using the optical connectors 10A according to Embodiment 2 is described.

Figure 15:
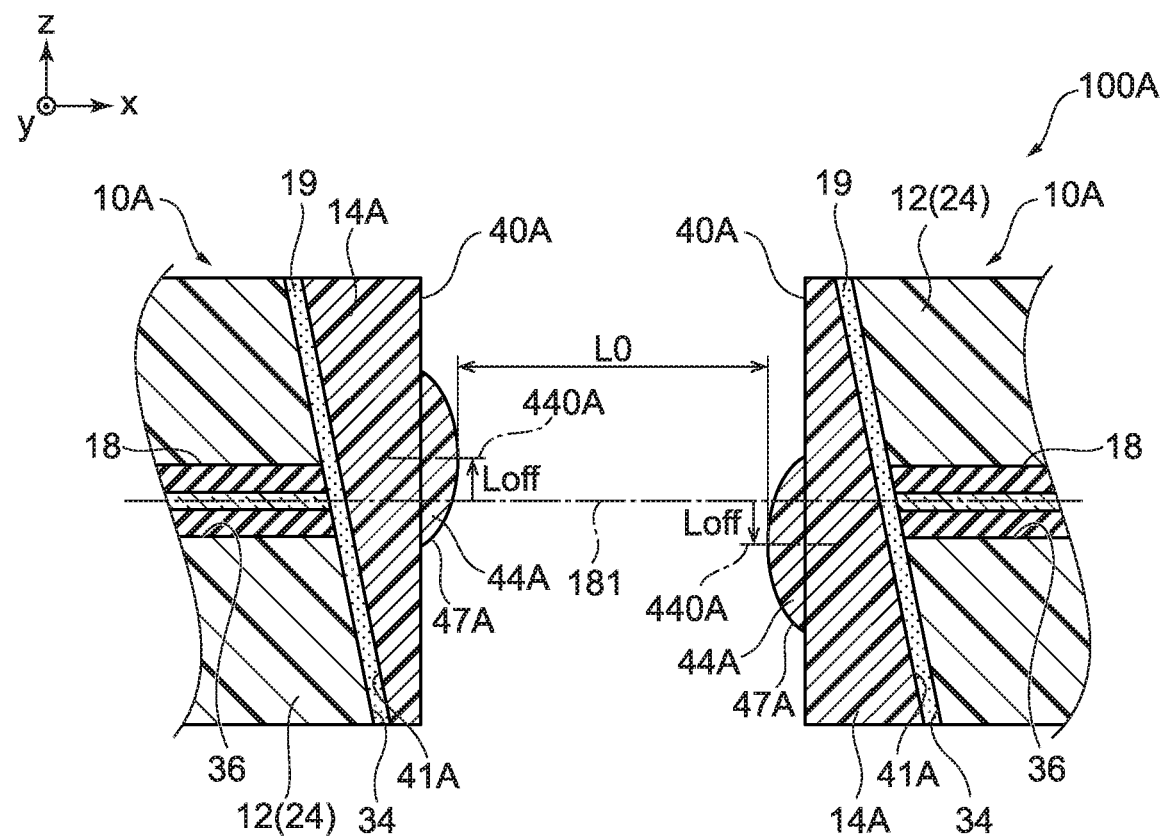
FIG. 15 is a diagram showing an optical connector connection structure using the optical connectors according to Embodiment 2.

FIG. 15 is a diagram showing the optical connector connection structure using the optical connectors 10A according to Embodiment 2. Note that in FIG. 15, for example, one optical fiber 18 among the optical fibers 18 fixed to the ferrule 12, and one lens 44A corresponding to this fiber are typically shown.

As shown in FIG. 15, in the optical connector connection structure 100A, the two optical connectors 10A allow the lenses 44A of one optical connector 10A and the lenses 44A of the other optical connector 10A to be disposed to face each other.

In the optical connector connection structure 100A, as with the optical connector connection structure 100 according to Embodiment 1, the two optical connectors 10A are disposed apart from each other such that the inter-lens-end distance L0 between the lens apexes of the lenses 44A of the one optical connector 10A and the lens apexes of the lenses 44A of the other optical connector 10A can have an appropriate value.

In the optical connector connection structure 100A, the two optical connectors 10A are disposed to face each other such that the deviating direction of the optical axes 440A of the lenses 44A from the optical axes 181 of the optical fibers 18 in the one optical connector 10A is opposite to the deviating direction of the optical axes 440A of the lenses 44A from the optical axes 181 of the optical fibers 18 in the other optical connector 10A.

For example, as shown in FIG. 15, in a case where the optical axes 181 of the optical fibers 18 of the two optical connectors 10A are disposed to coincide respectively with each other, the lenses 44A of the one optical connector 10A are disposed to deviate by an offset length Loff in the positive direction on the Z axis from the optical axes 181 of the common optical fibers 18, and the lenses 44A of the other optical connector 10A are disposed to deviate by the offset length Loff in the negative direction on the Z axis from the optical axes 18A of the common optical fibers 18.

Figure 16:
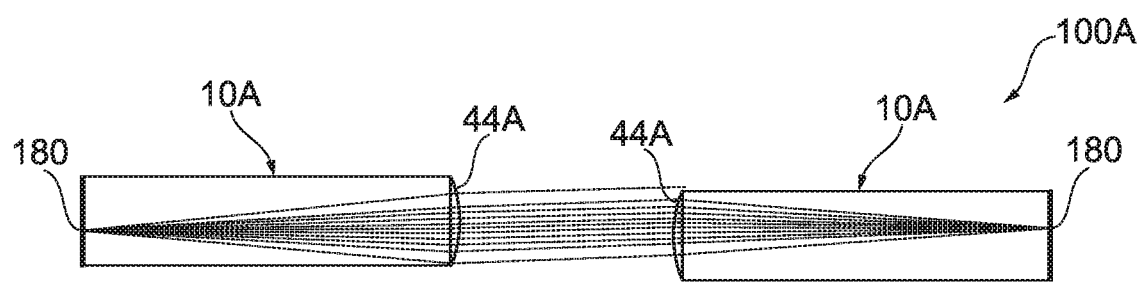
FIG. 16 is a diagram for illustrating propagation of light in an optical connector connection structure according to Embodiment 2.

FIG. 16 is a diagram for illustrating propagation of light in the optical connector connection structure 100A according to Embodiment 2.

As shown in FIG. 16, in the optical connector connection structure 100A, the lenses 44A of the two optical connectors 10A are disposed opposite to each other in a state of being offset in the directions opposite to each other with respect to the optical axes 181 of the optical fibers 18. Accordingly, light emitted from the one optical connector 10A obliquely from the optical axes 181 of the optical fibers 18 is enabled to enter the lenses 44A of the other optical connector 10A appropriately. Accordingly, in the optical connectors 10A, the transmission loss of light that can be caused by the fact that the optical axes 440A of the lenses 44A are offset from the optical axes 181 of the respective optical fibers 18, can be compensated.

In the optical connector connection structure 100A, as the offset length Loff is larger, the transmission loss of light can be reduced by reducing the inter-lens-end distance L0 of the two optical connectors 10A. Consequently, in the optical connector connection structure 100A, it is only required to adjust the inter-lens-end distance L0 appropriately according to the offset length Loff.

As described above, in the optical connector 10A according to Embodiment 2, the optical axis 440A of the lens 44A deviates from the direction perpendicular to the optical axis 181 of the corresponding optical fiber 18. Accordingly, the rate of coupling of the reflected light by the protruding surfaces 47A of the lenses 44A into the optical fibers 18 can be reduced. Accordingly, the return loss during light transmission can be reduced.

For example, even with the anti-reflective coating being applied onto the protruding surfaces 47 of the lenses 44, if the light entering the optical connector 10 is in a wide band that is a wavelength band from 1,260 nm to 1,565 nm (from the O band to C band), the return loss becomes about −25 dB by being affected by reduction in anti-reflective performance based on the wavelength dependency of the anti-reflective coating, and there is a possibility that it is difficult to obtain reflection equal to or less than −45 dB over the entire wavelength band. However, with the optical connector 10A according to Embodiment 2, even if the anti-reflective performance of the anti-reflective coating is reduced as described above, the return loss equal to or less than −45 dB can be achieved.

In the optical connector connection structure 100A including the optical connectors 10A according to Embodiment 2, the two optical connectors 10A are disposed to face each other such that the deviating direction of the optical axes 440A of the lenses 44A from the optical axes 181 of the optical fibers 18 in the one optical connector 10A is opposite to the deviating direction of the optical axes 440A of the lenses 44A from the optical axes 181 of the optical fibers 18 in the other optical connector 10A. Accordingly, as described above, the transmission loss of light that can be caused by the fact that the optical axes 440A of the lenses 44A are offset from the optical axes 181 of the respective optical fibers 18, can be compensated.

Figure 17:
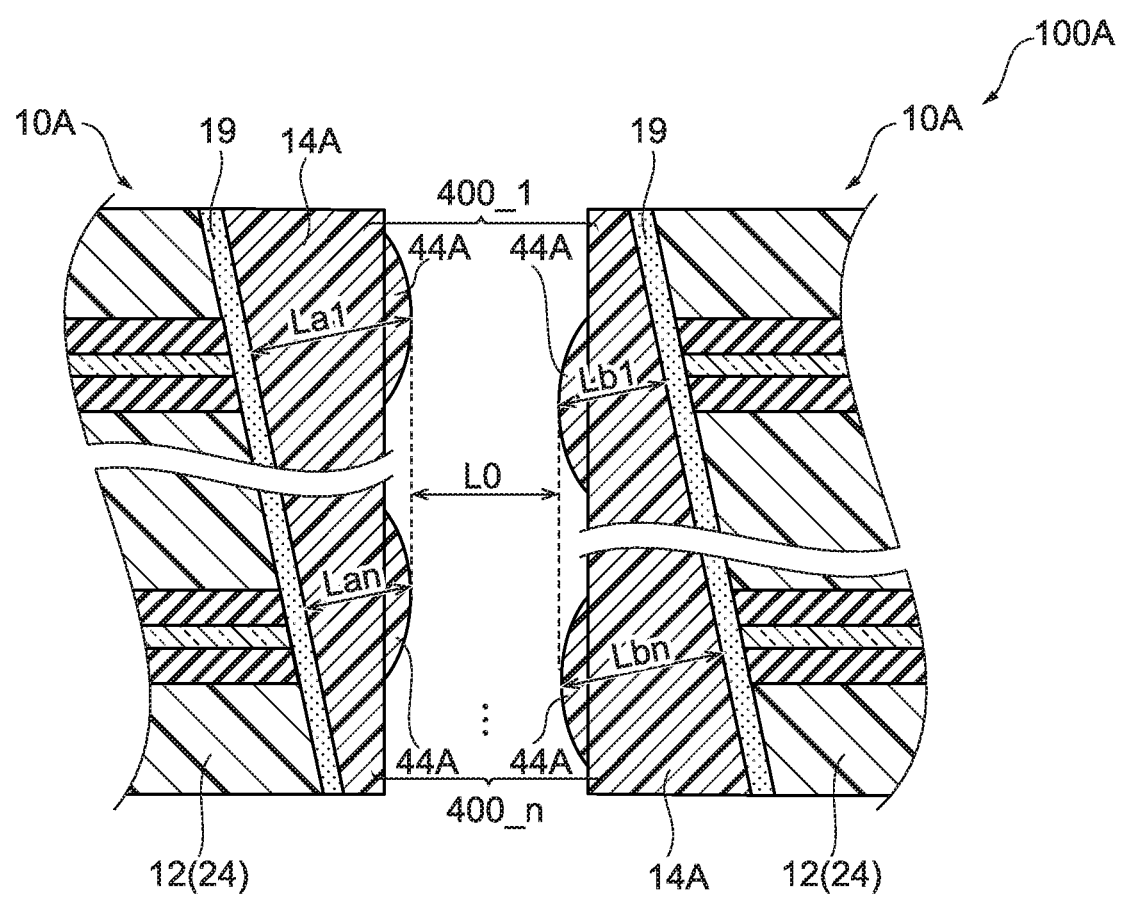
FIG. 17 is a diagram for illustrating optical path lengths in lens array plates in the optical connector connection structure according to Embodiment 2.

As shown in FIG. 17, as with the optical connector connection structure 100 according to Embodiment 1, the optical connector connection structure 100A may be configured such that the optical path lengths in the lens array plates 14A with respect to each of the lens pairs 400A_1 to 400A_n can be equal to each other. That is, in FIG. 17, the optical connector connection structure 100A may be configured such that (La1+Lb1)=(Lan+Lbn).

According to this, the relative error of transmission characteristics between optical transmission paths based on the lens pairs 400A_1 to 400A_n can be reduced. Consequently, in the optical connector connection structure 100A, the return loss uniform over the optical transmission paths can be achieved.

Embodiment 3

Figure 18:
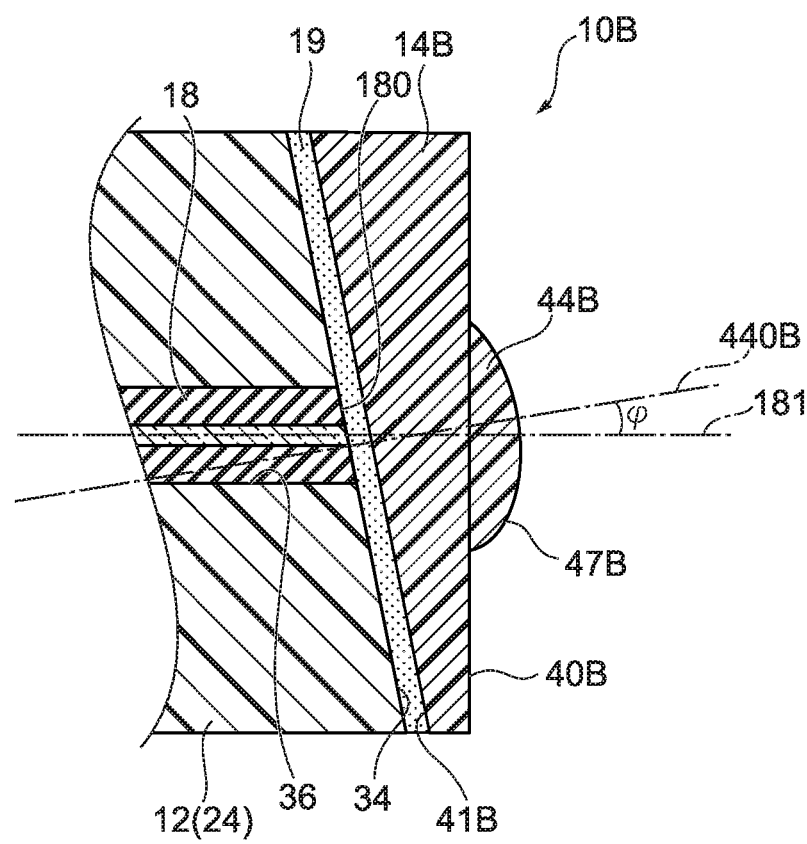
FIG. 18 is a diagram showing an optical connector connection structure using optical connectors according to Embodiment 3.

FIG. 18 is a diagram showing a configuration of an optical connector 10B according to Embodiment 3. In this diagram, the joining part between the optical fibers 18 and the lens array plate 14B in the optical connector 10B according to Embodiment 3 are schematically shown. Note that in FIG. 18, for example, one optical fiber 18 among the optical fibers 18 fixed to the ferrule 12, and one lens 44A corresponding to this fiber are typically shown.

The optical connector 10B according to Embodiment 3 is different from the optical connector 10 according to Embodiment 1 in that the optical axes 440B of the lenses 44B deviate from the optical axes 180B of the corresponding optical fibers 18, but is analogous to the optical connector 10 according to Embodiment 1 in other points.

Specifically, in the optical connector 10B, the optical axes 440B of the lenses 44B formed on the lens-side end face 40 of the lens array plate 14B are respectively inclined (tilted) from the optical axes 181 of the corresponding optical fibers 18.

Provided that the inclination angle of the optical axis 440B of each lens 44B from the optical axis 181 of the corresponding optical fiber 18 is $\phi$ [degrees(°)], $0°<\phi<90°$ holds. Preferably, $\phi \geq 2°$. More preferably, the degree is 60.

Figure 19:
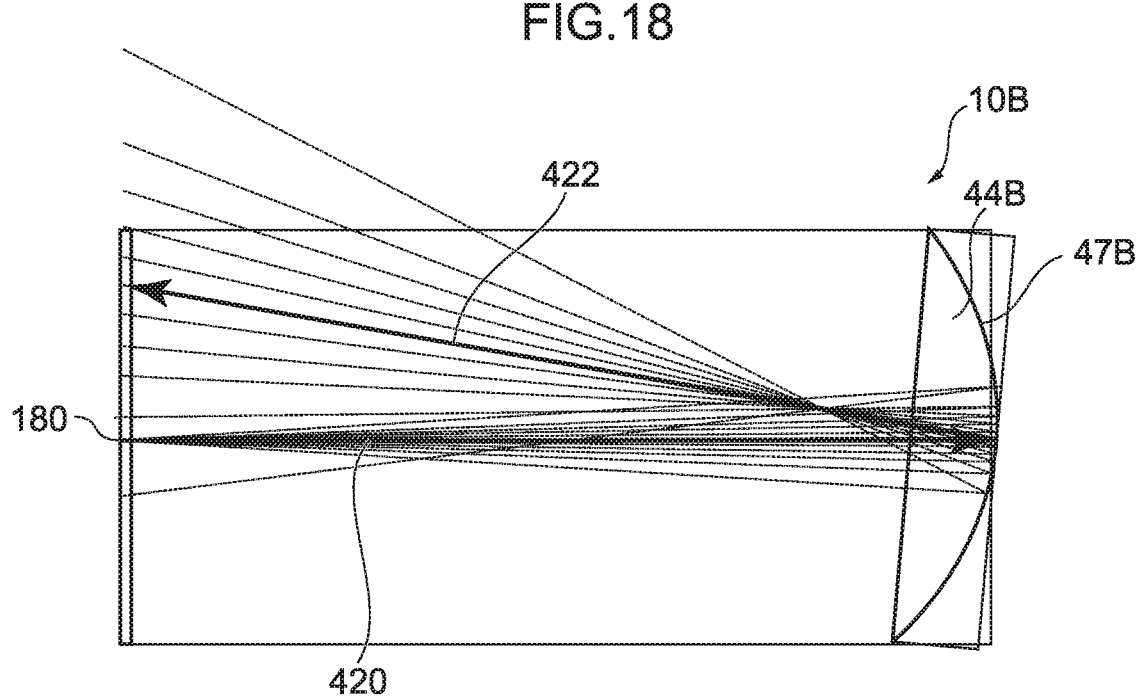
FIG. 19 is a diagram for illustrating propagation of light in the optical connector according to Embodiment 3.

FIG. 19 is a diagram for illustrating propagation of light in the optical connector 10B according to Embodiment 3.

As shown in FIG. 19, in the optical connector 10B, the optical axes 440B of the lenses 44B are tilted from the optical axes 181 of the optical fibers 18. Accordingly, if a part of light having entered the lens array plate 14B from the optical fibers 18 is reflected by the protruding surfaces 47B of the lenses 44B, the principal axis 422 of the reflected light is inclined from the principal axis 420 of the light having not been reflected yet. Accordingly, the rate of coupling of the reflected light by the protruding surfaces 47B of the lenses 44B into the optical fibers 18 can be reduced.

Thereafter, an optical connector connection structure using the optical connectors 10B according to Embodiment 3 is described.

Figure 20:
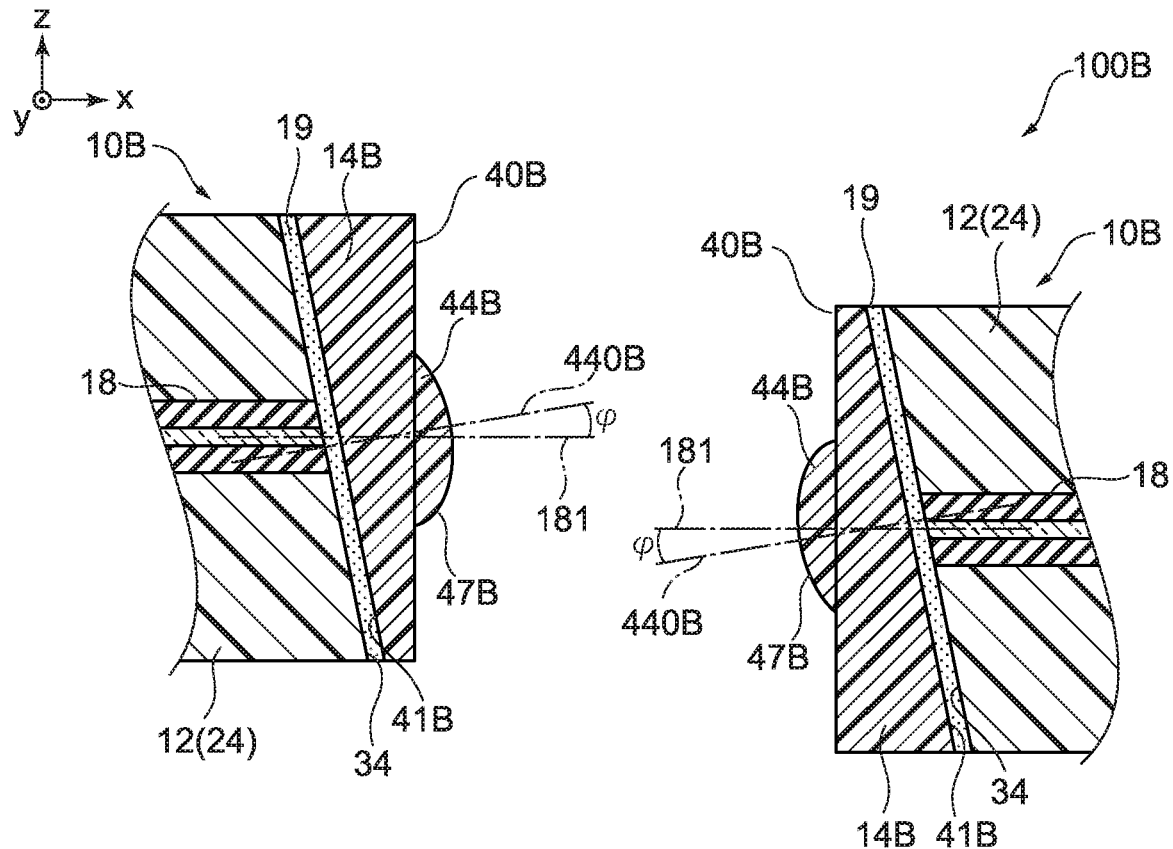
FIG. 20 is a diagram showing an optical connector connection structure using optical connectors according to Embodiment 3.

FIG. 20 is a diagram showing an optical connector connection structure using the optical connectors 10B according to Embodiment 3. Note that in FIG. 20, for example, one optical fiber 18 among the optical fibers 18 fixed to the ferrule 12, and one lens 44A corresponding to this fiber are typically shown.

As shown in FIG. 20, in the optical connector connection structure 100B, the two optical connectors 10B allow the lenses 44B of one optical connector 10B and the lenses 44B of the other optical connector 10B to be disposed to face each other.

In the optical connector connection structure 100B, as with the optical connector connection structure 100 according to Embodiment 1, the two optical connectors 10B are disposed apart from each other such that the inter-lens-end distance L0 between the lens apexes of the lenses 44B of the one optical connector 10B and the lens apexes of the lenses 44B of the other optical connector 10B can have an appropriate value.

In the optical connector connection structure 100B, the two optical connectors 10B are disposed to face each other such that the direction of inclination of the optical axes 440B of the lenses 44B from the optical axes 181 of the optical fibers 18 in the one optical connector 10B is opposite to the direction of inclination of the optical axes 440B of the lenses 44B from the optical axes 181 of the optical fibers 18 in the other optical connector 10B.

For example, as shown in FIG. 20, in a case where the two optical connectors 10B are disposed to face each other, the lenses 44B of the one optical connector 10B are disposed to be inclined by an inclination angle $\phi$ in the positive direction on the Z axis from the optical axes 181 of the optical fibers 18 whose axes are common to the optical axes 440B of the lenses 44B, and lenses 44B of the other optical connector 10B are disposed to be inclined by an inclination angle $\phi$ in the negative direction on the Z axis from the optical axes 181 of the optical fibers 18 whose axes are common to the optical axes 440B of the lenses 44B.

Figure 21:
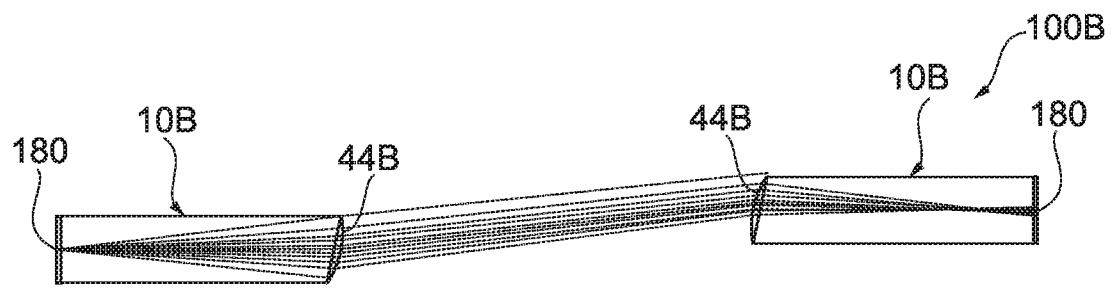
FIG. 21 is a diagram for illustrating propagation of light in an optical connector connection structure according to Embodiment 3.

FIG. 21 is a diagram for illustrating propagation of light in the optical connector connection structure 100B according to Embodiment 3.

As shown in FIG. 21, in the optical connector connection structure 100B, the optical axes 440B of the lenses 44B of the two optical connectors 10B are disposed to face each other in a state of being tilted in the directions opposite to each other with respect to the optical axes 181 of the optical fibers 18. Accordingly, light emitted from the one optical connector 10B obliquely from the optical axes 181 of the optical fibers 18 is enabled to enter the lenses 44B of the other optical connector 10B appropriately. Accordingly, in the optical connectors 10B, the transmission loss of light that can be caused by the fact that the optical axes 440B of the lenses 44B are offset from the optical axes 181 of the respective optical fibers 18, can be compensated.

In the optical connector connection structure 100B, the larger the offset is, the smaller the inter-lens-end distance L0 between the two optical connectors 10B having the minimum transmission loss is. Consequently, in the optical connector connection structure 100B, it is only required to adjust the inter-lens-end distance L0 appropriately according to the offset.

In the optical connector connection structure 100B, the larger the inclination angle $\phi$ is, the larger the inter-lens-end distance L0 between the two optical connectors 10B having the minimum transmission loss is. Consequently, in the optical connector connection structure 100B, it is only required to adjust the inter-lens-end distance L0 appropriately according to the inclination angle $\phi$.

As described above, in the optical connector 10B according to Embodiment 3, the lenses 44B are disposed such that the optical axes 440B of the lenses 44B can be respectively inclined from the optical axes 181 of the corresponding optical fibers 18. Accordingly, the rate of coupling of the reflected light by the protruding surfaces 47B of the lenses 44B into the optical fibers 18 can be reduced. Accordingly, the return loss during light transmission can be reduced.

In the optical connector connection structure 100B including the optical connectors 10B according to Embodiment 3, the two optical connectors 10B are disposed to face each other such that the direction of inclination of the optical axes 440B of the lenses 44B from the optical axes 181 of the optical fibers 18 in the one optical connector 10B is opposite to the direction of inclination of the optical axes 440B of the lenses 44B from the optical axes 181 of the optical fibers 18 in the other optical connector 10B. Accordingly, as described above, the transmission loss of light that can be caused by the fact that the optical axes 440B of the lenses 44B are tilted from the optical axes 181 of the respective optical fibers 18, can be compensated.

Figure 22:
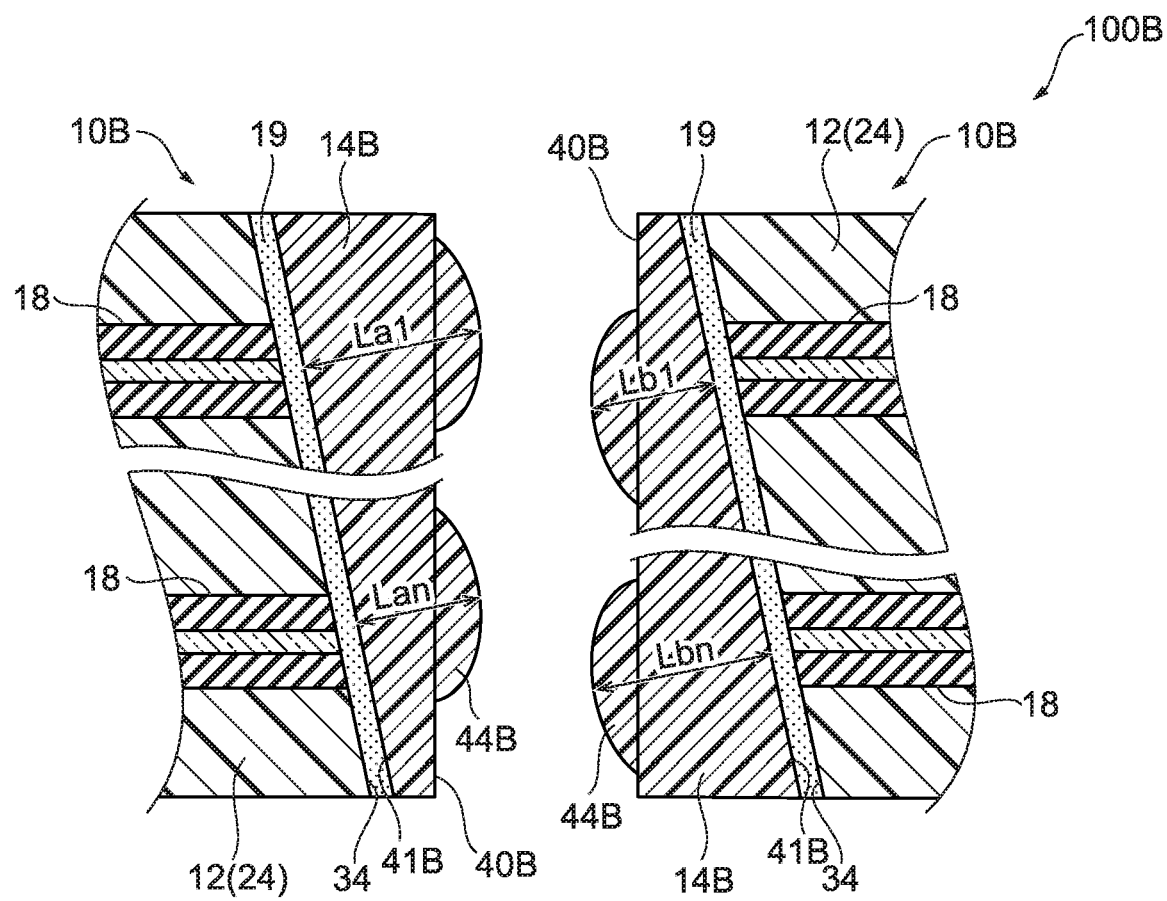
FIG. 22 is a diagram for illustrating optical path lengths in lens array plates in the optical connector connection structure according to Embodiment 3.

As shown in FIG. 22, as with the optical connector connection structure 100 according to Embodiment 1, the optical connector connection structure 100B may be configured such that the optical path lengths in the lens array plates 14B with respect to each of the lens pairs 400B_1 to 400B_n can be equal to each other. That is, in FIG. 22, the optical connector connection structure 100B may be configured such that (La1+Lb1)=(Lan+Lbn).

According to this, the relative error of transmission characteristics between optical transmission paths based on the lens pairs 400_1 to 400_*n* can be reduced. Consequently, in the optical connector connection structure 100B, the return loss uniform over the optical transmission paths can be achieved.

In Embodiment 3 described above, the case where the lens-side end face 40 is perpendicular to the optical axes 18B of the optical fibers 18 and the lens rear face 41 of the lens array plate 14B is non-perpendicular to the optical axes 18B of the optical fibers 18 is exemplified. However, only if the lenses 44B having optical axes 440B inclined from the optical axes 181 of the optical fibers 18 are included, the shape of the lens array plate is not specifically limited.

Figure 23:
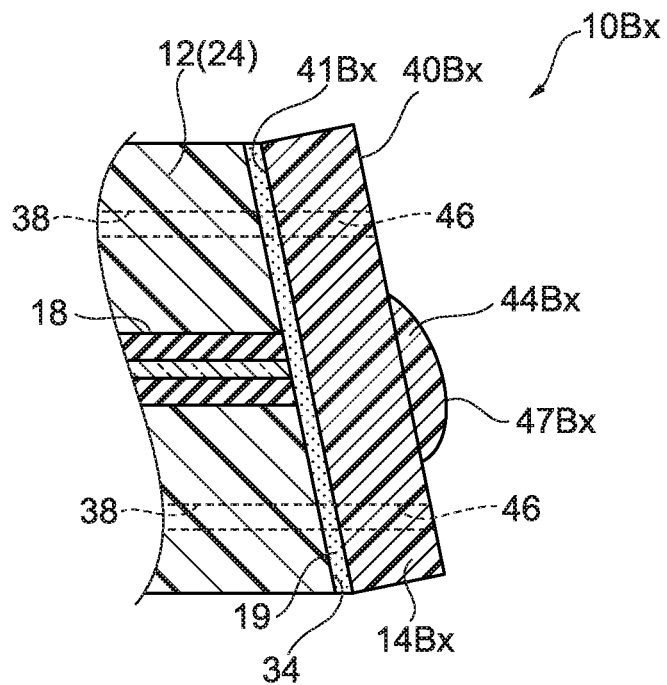
FIG. 23 is a diagram showing another example of the lens array plate of an optical connector according to Embodiment 3.

For example, as with an optical connector 10Bx shown in FIG. 23, a lens array plate 14Bx where the lens-side end face 40Bx with the lenses 44Bx being formed and the lens rear face 41Bx are parallel to each other may be prepared, and the lens rear face 41Bx of the lens array plate 14Bx may be joined with the adhesive 19 to the connection-side end face 34 of the ferrule 12. This facilitates the formation of the lenses 44Bx. However, in this case, the guide pin insertion holes 46 are required to be formed to be inclined from the lens-side end face 40Bx.

Extension of Embodiments

The disclosure by the present inventors has thus been described on the basis of the embodiments. However, the disclosure is not limited to the description. It is a matter of course that the disclosure can be variously changed in a range without departing from the gist.

For example, in the embodiments described above, the cases where the ferrule 12 is configured as a component separate from the lens array plate 14, 14A, 14B is exemplified. Alternatively, the ferrule 12 may be formed integrally with any of the lens array plates 14, 14A and 14B.

Figure 24:
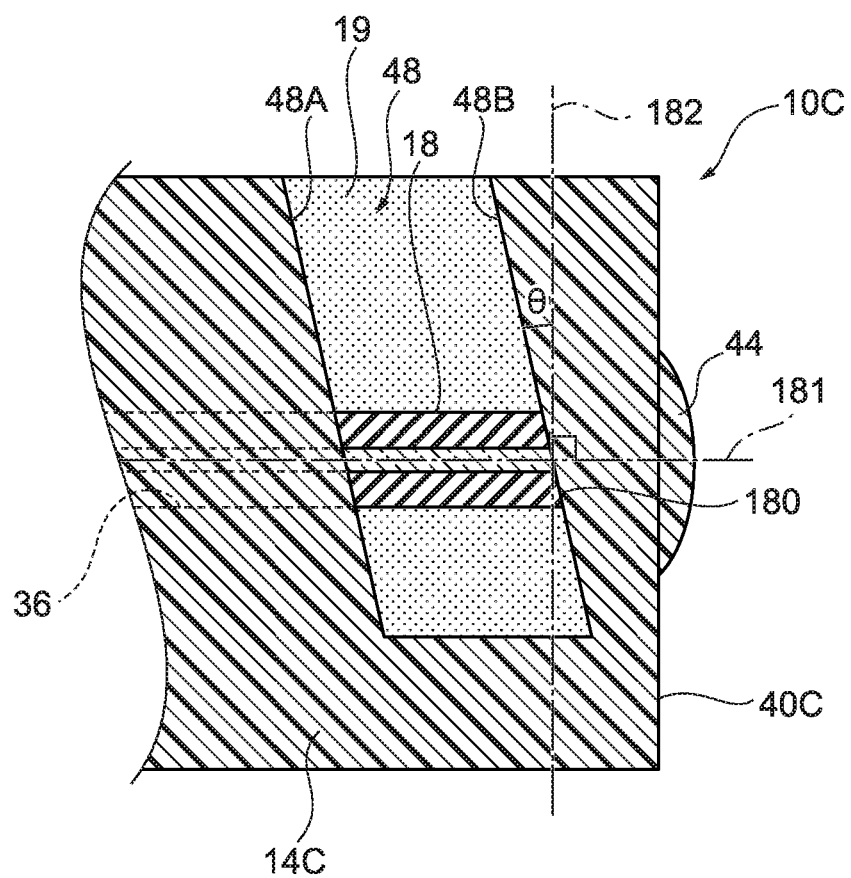
FIG. 24 is a diagram showing a configuration of an optical connector that integrates a lens array plate and a ferrule.

For example, as with an optical connector 10C shown in FIG. 24, an opening 48 is formed in a lens array plate 14C integrally formed of the same material as that of the ferrule. The opening 48 is formed such that inner wall surfaces 48A and 48B are inclined from the plane 182 perpendicular to the optical axes 181 of the optical fibers 18 (inclination angle θ≥5°). The optical fibers 18 are then inserted into the optical fiber insertion holes 36, and in a state where the end faces 180 of the optical fibers 18 contact the inner wall surface 48B of the opening 48, the opening 48 is filled with the adhesive 19.

According to the optical connector 10C, operations and advantageous effects analogous to those of the optical connectors 10, 10A and 10B described above can be expected.

Figure 25:
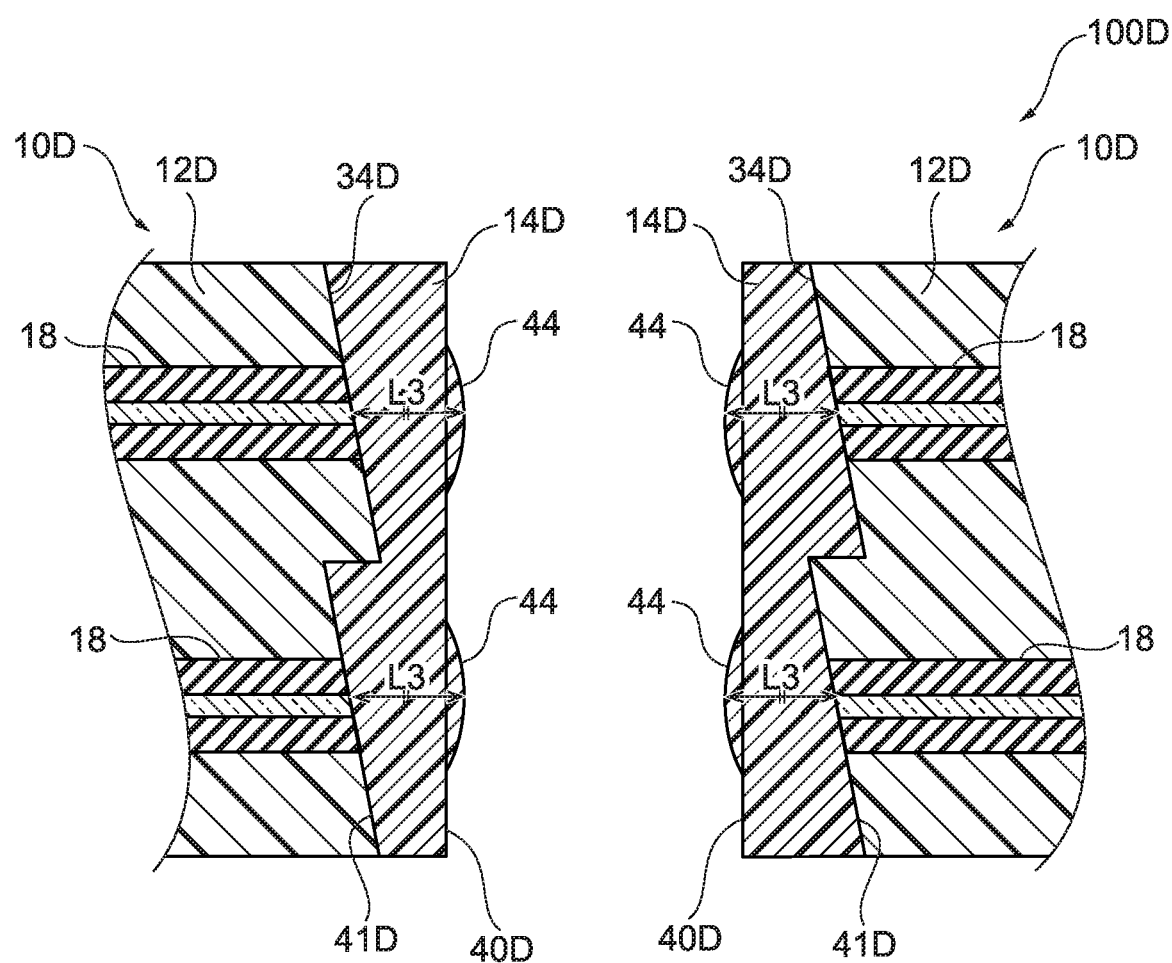
FIG. 25 is a diagram showing a configuration of an optical connector where connection surfaces of lens array plates and ferrules are formed in a stepwise manner.

In the embodiments described above, as shown in FIG. 9 and the like, the case where the two optical connectors 10 are disposed such that the optical path lengths in the lens array plates 14 with respect to each pair of lenses 44 disposed to face each other can be equal to each other is exemplified. However, the embodiments are not limited to this. For example, as with an optical connector connection structure 100D including two optical connectors 10D shown in FIG. 25, lens rear faces 41D of lens array plates 14D and connection-side end faces 34D of ferrules 12D may be formed in a stepwise manner such that the optical path lengths L3 in the lens array plate 14D of the corresponding lenses 44 can be equal to each other.

In the embodiments described above, the case where optical fibers 18 are achieved as stacks of the optical fiber tape core wires 20 is exemplified. However, the embodiments are not limited to this. Alternatively, a plurality of optical fiber tape core wires including single cores may be used. The optical fibers 18 may be internally included in a cable, a cord or the like.

In the embodiments described above, the case where the end faces 180 of the optical fibers 18 and the lens rear face 41 of the lens array plate 14 serving as the second principal surface are inclined from the plane 182 perpendicular to the optical axes 181 of the optical fibers 18 is exemplified. However, the embodiments are not limited to this.

Figure 26:
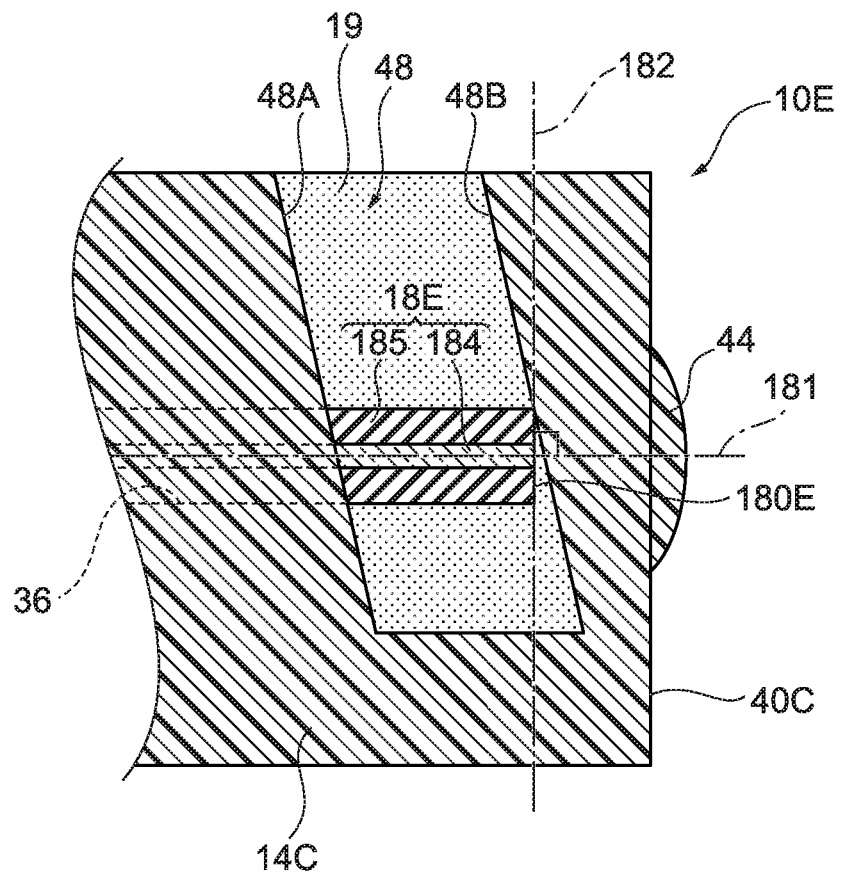
FIG. 26 is a diagram schematically showing a joining part between an optical fiber and a lens array plate in an optical connector according to another embodiment of the present disclosure.

For example, as with the optical connector 10E shown in FIG. 26, the lens rear face 41 of the lens array plate 14 serving as the second principal surface may be inclined from the plane 182 perpendicular to the optical axes 181 of the optical fibers 18, and the end faces 180E of the optical fibers 18E may be parallel to the plane 182. Alternatively, the end faces 180E of the optical fibers 18E may be inclined from the plane 182, and the lens rear face 41 of the lens array plate 14 serving as the second principal surface may be parallel to the plane 182. That is, it is only required that at least one of the end faces 180 of the optical fibers 18 and the lens rear face 41 of the lens array plate 14 serving as the second principal surface are inclined from the plane 182 perpendicular to the optical axes 181 of the optical fibers 18.

In this case, it is preferable that the refractive index of the adhesive 19 used for adhesion between the optical fiber array and the lens array plate conform to the refractive index of the medium (the optical fibers or the lens array plate) on a side whose interface be not inclined.

Figure 27:
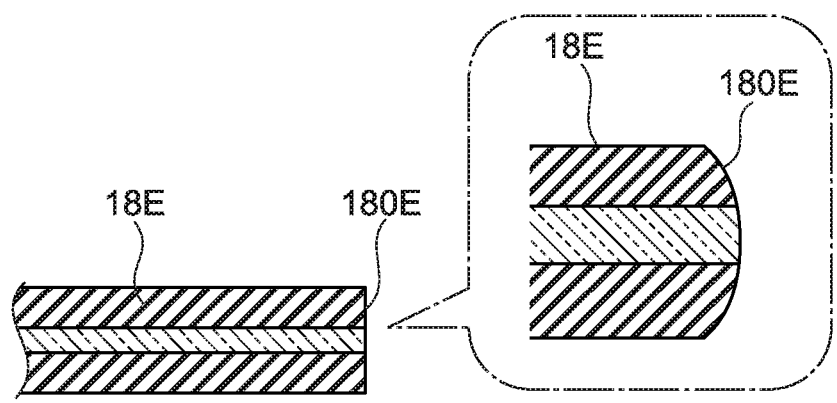
FIG. 27 is a diagram showing an example of an optical fiber used in the optical connector shown in FIG. 26.
Figure 28:
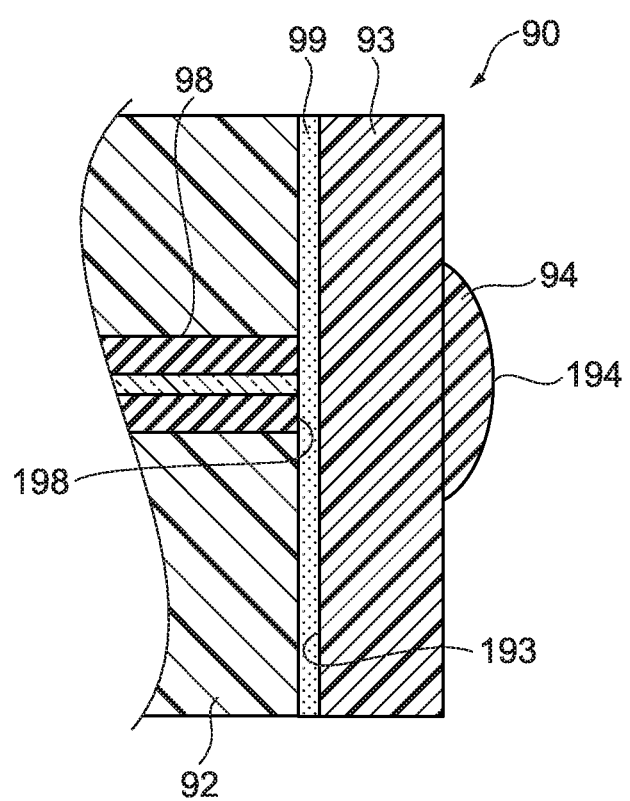
FIG. 28 is a diagram schematically showing a configuration of an optical connector according to a lens scheme that the inventors of the present application discussed prior to the present application.

In the case of the optical connector 10E shown in FIG. 26, as with the above description, optical fibers with one ends being cut by melting using the laser cleaver may be used. That is, as shown in FIG. 27, cut surfaces (end faces 180E) of the optical fibers 18E of the optical connector 10E may have rounded shapes due to heat during melting.

What is claimed is:

1. An optical connector, comprising:
   a plurality of optical fibers arranged in an array; and
   a lens array plate that includes a first principal surface with a plurality of lenses corresponding to the respective optical fibers being formed on this surface, and a second principal surface joined to end faces of the optical fibers so as to be opposed to the first principal surface and optically coupled to the optical fibers to which the respective lenses correspond,
   wherein at least one of the end faces of the optical fibers and the second principal surface is inclined from a plane perpendicular to optical axes of the optical fibers,
   wherein the end faces of the optical fibers are respectively disposed substantially at rear focal points of the corresponding lenses,
   wherein a distance between a tip portion of a protruding surface of a lens of the plurality of lenses and a point FX on which the reflected light by the lens is focused is Lx1,
   wherein a distance between the end face of the optical fiber and the point FX is Lx2, and
   wherein Lx2≥3Lx1.

2. The optical connector according to claim 1,
   wherein an inclination angle of at least one of the end faces of the optical fibers and the second principal surface from the plane is at least three degrees.

3. The optical connector according to claim 1,
   wherein the lenses are disposed in a state of deviating from the optical axes of the optical fibers to which the optical axes of the lenses correspond.

4. The optical connector according to claim 3,
wherein the optical axis of each of the lenses deviates in a direction perpendicular to the optical axis of the corresponding optical fiber.

5. The optical connector according to claim 4,
wherein deviating amounts of the optical axes of the lenses from the optical axes of the respective optical fibers are at least 5 μm.

6. The optical connector according to claim 3,
wherein the optical axis of each of the lenses is inclined from the optical axis of the corresponding optical fiber.

7. The optical connector according to claim 6,
wherein inclination angles of the optical axes of the lenses from the optical axes of the respective optical fibers are at least two degrees.

8. The optical connector according to claim 6,
wherein inclination angles of the optical axes of the lenses from the optical axes of the respective optical fibers are at least six degrees.

9. The optical connector according to claim 1,
wherein the optical fibers and the lenses are configured to transmit light having wavelengths in a range from 1,260 nm to 1,565 nm.

10. An optical connector connection structure, comprising two optical connectors according to claim 4,
wherein the lenses of one of the optical connectors and the lenses of another of the optical connectors are disposed such that the corresponding lenses face each other, and
a deviating direction of the optical axes of the lenses from the optical axes of the optical fibers in the one optical connector is opposite to a deviating direction of the optical axes of the lenses from the optical axes of the optical fibers in the other optical connector.

11. An optical connector connection structure, comprising two optical connectors according to claim 6,
wherein the lenses of one of the optical connectors and the lenses of another of the optical connectors are disposed such that the corresponding lenses face each other, and
a direction of an inclination of the optical axes of the lenses from the optical axes of the optical fibers in the one optical connector is opposite to a direction of an inclination of the optical axes of the lenses from the optical axes of the optical fibers in the other optical connector.

12. An optical connector connection structure, comprising two optical connectors according to claim 1,
wherein the lenses of one of the optical connectors and the lenses of another of the optical connectors are disposed such that the corresponding lenses face each other, and
the two optical connectors are configured such that optical path lengths in the lens array plates with respect to pairs of the lenses disposed opposite to each other are equal to each other.

13. The optical connector connection structure according to claim 10,
wherein the two optical connectors are configured such that optical path lengths in the lens array plates with respect to pairs of the lenses disposed opposite to each other are equal to each other.

14. The optical connector according to claim 1, wherein the lenses are disposed to coincide with the optical axes of the optical fibers to which the optical axes of the lenses correspond.

15. The optical connector according to claim 1, wherein the optical axes of the optical fibers are disposed in a state of deviating from rear focal points of the corresponding lenses.

* * * * *